United States Patent
Chang et al.

(10) Patent No.: US 11,915,690 B1
(45) Date of Patent: Feb. 27, 2024

(54) AUTOMATIC SPEECH RECOGNITION

(71) Applicant: Amazon Technologies, Inc., Seattle, WA (US)

(72) Inventors: Feng-Ju Chang, Pittsburgh, PA (US); Martin Radfar, Ontario (CA); Athanasios Mouchtaris, Pittsburgh, PA (US); Brian King, Bellingham, WA (US); Siegfried Kunzmann, Heidelberg (DE); Maurizio Omologo, Altopiano della Vigolana (IT)

(73) Assignee: Amazon Technologies, Inc., Seattle, WA (US)

( * ) Notice: Subject to any disclaimer, the term of this patent is extended or adjusted under 35 U.S.C. 154(b) by 51 days.

(21) Appl. No.: 17/488,896

(22) Filed: Sep. 29, 2021

Related U.S. Application Data

(60) Provisional application No. 63/211,722, filed on Jun. 17, 2021.

(51) Int. Cl.
  *G10L 15/18* (2013.01)
  *H04R 3/00* (2006.01)
  (Continued)

(52) U.S. Cl.
  CPC .............. *G10L 15/18* (2013.01); *G10L 15/22* (2013.01); *G10L 19/008* (2013.01); *H04R 3/005* (2013.01);
  (Continued)

(58) Field of Classification Search
  CPC ......... G10L 15/26; G10L 15/06; G10L 15/28; G10L 15/16; G10L 15/18; G10L 15/183; G10L 15/22; G10L 15/20; G10L 15/02; G10L 15/063; G10L 15/07; G10L 13/027; G10L 2015/225; G10L 21/02;
  (Continued)

(56) References Cited

U.S. PATENT DOCUMENTS

| | | | | |
|---|---|---|---|---|
| 2021/0375289 A1* | 12/2021 | Zhu | ............... | G06Q 10/063118 |
| 2022/0076100 A1* | 3/2022 | Hori | ....................... | G06N 3/063 |
| 2022/0270597 A1* | 8/2022 | Qiu | ......................... | G10L 15/08 |

FOREIGN PATENT DOCUMENTS

CN  112071329 A  * 12/2020  ............. G10L 15/02

OTHER PUBLICATIONS

Ochiai et al., "Multichannel End-to-end Speech Recognition", Proceedings of the 34th International Conference on Machine Learning, Sydney, Australia, PMLR 70, p. 1-10 (Year: 2017).*

(Continued)

*Primary Examiner* — Leshui Zhang
(74) *Attorney, Agent, or Firm* — Pierce Atwood LLP

(57) ABSTRACT

A multi-channel transformer acoustic model that processes a plurality of audio signals output by microphones of a microphone array and outputs probabilities for acoustic units of an utterance represented in the audio signals. The audio signals represent the individual microphones' respective capturing of the utterance. The multi-channel model may perform self-attention on embeddings of the audio signals and then cross-channel attention across the attended audio signals. The cross-channel attention may involve processing of signals relative to each other to model the relationships across channels within and across time frames. The multi-channel model may include a transducer to perform processing frame-by-frame.

20 Claims, 21 Drawing Sheets

(51) Int. Cl.
  *G10L 15/22* (2006.01)
  *G10L 19/008* (2013.01)
  *G10L 13/027* (2013.01)
(52) U.S. Cl.
  CPC ...... *G10L 13/027* (2013.01); *G10L 2015/225* (2013.01)
(58) Field of Classification Search
  CPC ............... G10L 21/028; G10L 21/0272; G10L 21/0208; G10L 19/008; H04R 3/005; H04R 3/00; H04R 25/00; H04R 25/407; H04R 25/505
  USPC ............ 704/270, 270.1, 272, 273, 275, 277, 704/500–504; 706/15, 16, 18, 21, 22, 24, 706/25, 30, 31, 34, 37; 381/1–23, 61, 66, 381/71.1–71.14, 92, 119, 122; 700/94
  See application file for complete search history.

(56) References Cited

OTHER PUBLICATIONS

Wang et al., "Tune-In: Training Under Negative Environments with Interference for Attention Networks Simulating Cocktail Party Effect", Association for the Advancement of Artificial Intelligence, www.aaai.org, Mar. 2, pp. 1-15 (Year: 2021).*
Braun et al., "Multi-channel Attention for End-to-End Speech Recognition", Zurich Open Repository and Archive, University of Zurich, University Library, www.zora.uzh.ch, pp. 17-21 (Year: 2018).*
R. Haeb-Umbach, et al., "Far-Field Automatic Speech Recognition." In Proceedings of the IEEE, vol. 109, No. 2, Feb. 2021, pp. 124-148, arXiv preprint arXiv:2009.09395v.1.
M. Omologo, et al., "Speech Recognition with Microphone Arrays," in Microphone Arrays Signal Processing Techniques and Applications. Springer-Verlag, Berlin, Heidelberg, New York, 2001, pp. 331-353.
K. Kumatani, et al., "Microphone Array Processing for Distant Speech Recognition: From Close-Talking Microphones to Far-Field Sensors," IEEE Signal Processing Magazine, Nov. 2012, vol. 29, No. 6, pp. 127-140, retrieved from IEEE Xplore.
K. Kinoshita et al., "A summary of the reverb challenge: state-of-the-art and remaining challenges in reverberant speech processing research," EURASIP Journal on Advances in Signal Processing, vol. 2016, No. 1, pp. 1-19.
T. Menne, et al., "The rwth/upb/forth system combination for the 4th chime challenge evaluation," in CHiME-4 workshop, 2016, 6 pages, retrieved from https://www.researchgate.net/publication/320584773_The_RWTHUPBFORTH_System_Combination_for_the_4th_CHiME_Challenge_Evaluation.
Barker, et al., "The third 'CHiME' Speech Separation and Recognition Challenge: Dataset, task and baselines." IEEE Automatic Speech Recognition and Understanding Workshop (ASRU), 2015, 8 pages, retrieved from https://hal.inria.fr/hal-01211376/document.
S. Doclo, et al., "Superdirective Beamforming Robust Against Microphone Mismatch," IEEE Transactions on Audio, Speech, and Language Processing (TASLP), 2007, vol. 15, No. 2, pp. 617-631.
I. Himawan, et al., "Clustered Blind Beam-Forming from Ad-Hoc Microphone Arrays," IEEE Transactions on Audio, Speech, and Language Processing (TASLP), 2011, vol. 19, No. 4, pp. 661-676.
X. Chen, et al., "On the Robustness of the Superdirective Beamformer," IEEE/ACM Transactions on Audio, Speech and Language Processing (TASLP), 2021, pp. 1-12, retrieved from https://www.researchgate.net/publication/348672716_On_the_Robustness_of_the_Superdirective_Beamformer.
J. Heymann, et al., "Neural network based spectral mask estimation for acoustic beamforming," in ICASSP, 2016, 5 pages, retrieved from https://groups.uni-paderborn.de/nt/pubs/2016/icassp_2016_heymann_paper.pdf.

H. Erdogan, et al., "Improved MVDR Beamforming Using Single-Channel Mask Prediction Networks." Proc. Interspeech, 2016, pp. 1981-1985. doi: 10.21437/Interspeech.2016-552.
T. Ochiai, et al., "Multichannel End-to-end Speech Recognition," 2017, 11 pages, arXiv preprint arXiv:1703.04783v1.
X. Chang, et al., "Mimo-Speech: End-to-end Multi-Channel Multi-Speaker Speech Recognition," in ASRU, 2019, 8 pages, arXiv preprint arXiv:1910.06522.
X. Chang, et al., "End-to-End Multi-Speaker Speech Recognition with Transformer," in ICASSP, 2020, pp. 6134-6138.
K. Kumatani, et al., "Multi-Geometry Spatial Acoustic Modeling for Distant Speech Recognition," in ICASSP, 2019, 5 pages, arXiv preprint arXiv:1903.06539.
B. Li, et al., "Neural Network Adaptive Beamforming for Robust Multichannel Speech Recognition." Proc. Interspeech 2016, pp. 1976-1980, retrieved from https://www.researchgate.net/publication/305684855_A_comparative_study_on_audiovisual_perception_of_final_boundaries_by_Chinese_and_English_observers.
X. Xiao et al., "Deep beamforming networks for multi-channel speech recognition," in ICASSP, 2016, pp. 5745-5749, doi:10.1109/ICASSP.2016.7472778.
Z. Meng, et al., "Deep long short-term memory adaptive beamforming networks for multichannel robust speech recognition," in ICASSP, 2017, 6 pages, arXiv preprint arXiv:1711.08016v1.
Y. Liu, et al., "Using neural network front-ends on far field multiple microphones based speech recognition," in ICASSP, IEEE International Conference on Acoustics, Speech and Signal Processing, May 2014, 5 pages, retrieved from https://www.researchgate.net/publication/267626175.
L. Drude, et al., "Unsupervised training of neural mask-based beamforming," 2019, 5 pages, arXiv preprint arXiv:1904.01578V2.
A. Vaswani, et al., "Attention is all you need." Proc. 31st Conference on Neural Information Processing Systems (NIPS 2017). In Advances in Neural Information Processing Systems 30 (NIPS 2017), 11 pages, retrieved from https://papers.nips.cc/paper/7181-attention-is-all-you-need.pdf.).
F.-J. Chang, et al., End-to-end multi-channel transformer for speech recognition, in ICASSP, 2021, 5 pages, retrieved from https://www.amazon.science/publications/end-to-end-multi-channel-transformer-for-speech-recognition.
Y. He, et al., "Streaming end-to-end speech recognition for mobile devices," in ICASSP, 2019, 5 pages, arXiv preprint arXiv:1811.06621v1.
D. Bahdanau, et al., "Neural machine translation by jointly learning to align and translate," 2014, published as conference paper at ICLR 2015, pp. 1-15, arXiv preprint arXiv:1409.0473.
A. Graves, et al., "Connectionist temporal classification: labelling unsegmented sequence data with recurrent neural networks," in Proceedings of the 23rd International Conference on Machine Learning, 2006, pp. 369-376, retrieved from https://www.cs.toronto.edu/~graves/icml_2006.pdf.
A. Graves, "Sequence transduction with recurrent neural networks," in International Conference on Machine Learning (ICML) workshop, 2012, 9 pages, arXiv preprint arXiv:1211.3711v1.
Chung-Chen Chiu, et al., "Monotonic Chunkwise Attention," published conference paper at ICLR, 2018, 16 pages, arXiv preprint arXiv:1712.05382v2.
N. Moritz, et al., "Triggered attention for end-to-end speech recognition," in ICASSP, 2019, 7 pages, retrieved from IEEE Xplore.
L. Dong, et al., "Speech-transformer: a no-recurrence sequence-to-sequence model for speech recognition," in ICASSP, 2018, pp. 5884-5888.
L. Lu, et al., "Exploring transformers for large-scale speech recognition," 2020, 5 pages, arXiv preprint arXiv:2005.09684.
Y. Wang, et al., "Transformer-based acoustic modeling for hybrid speech recognition," in ICASSP, 2020, pp. 6874-6878.
A. Gulati, et al., "Conformer: Convolution-augmented transformer for speech recognition," 2020, 5 pages, arXiv preprint arXiv:2005.08100.
T. N. Sainath, et al., "A streaming on-device end-to-end model surpassing server-side conventional model quality and latency," in ICASSP, 2020, pp. 4395-4399, arXiv preprint arXiv:2003.12710.

(56) References Cited

OTHER PUBLICATIONS

Z. Tian, et al., "Self-Attention Transducers for End-to-End Speech Recognition." Proc. Interspeech 2019, pp. 4395-4399, DOI: 10.21437/Interspeech.2019-2203.

C.-F. Yeh, et al., "Transformer-transducer: End-to-end speech recognition with self-attention," 2019, 5 pages, arXiv preprint arXiv:1910:12977.

Q. Zhang, et al., "Transformer transducer: A streamable speech recognition model with transformer encoders and rnn-tloss," ICASSP, 2020, 5 pages, arXiv preprint arXiv:2002.02562.

W. Huang, et al., "Conv-transformer transducer: Low latency, low frame rate, streamable end-to-end speech recognition," Interspeech, 2020, 5 pages, arXiv preprint arXiv:2008.05750.

Z.-Q. Wang, et al., "Combining Spectral and Spatial Features for Deep Learning Based Blind Speaker Separation." In IEEE/ACM Transactions on Audio, Speech, and Language Processing (TASLP), 2019, vol. 27, No. 2, pp. 457-468, retrieved from https://web.cse.ohio-state.edu/~wang.77/papers/Wang-Wang.taslp19.pdf.

Z.-Q. Wang, et al., "Multi-Channel Deep Clustering: Discriminative Spectral and Spatial Embeddings for Speaker- Independent Speech Separation." ICASSP, 2018, 5 pages.

D. P. Kingma, et al., "Adam: A Method for Stochastic Optimization," published as a conference paper at ICLR, 2015, 15 pages, arXiv preprint arXiv: 1412.6980.

R. Sennrich, et al, "Neural machine translation of rare words with subword units." In Proceedings of the 54th Annual Meeting of the Association for Computational Linguistics (ACL), 2016, pp. 1715-1725; retrieved from https://aclanthology.org/P16-1162/.

\* cited by examiner

FIG. 15
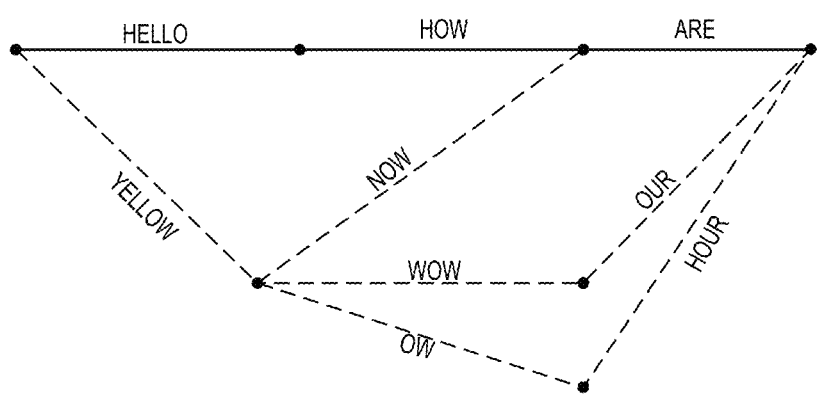
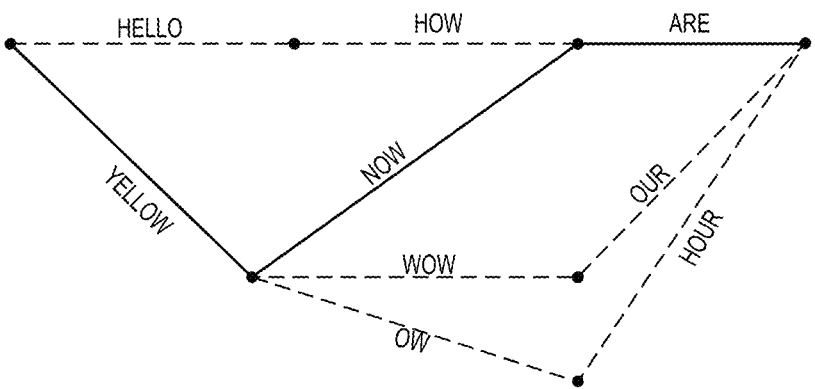
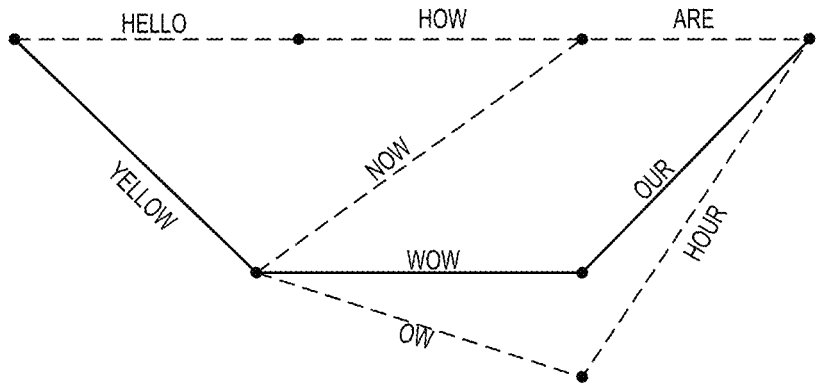

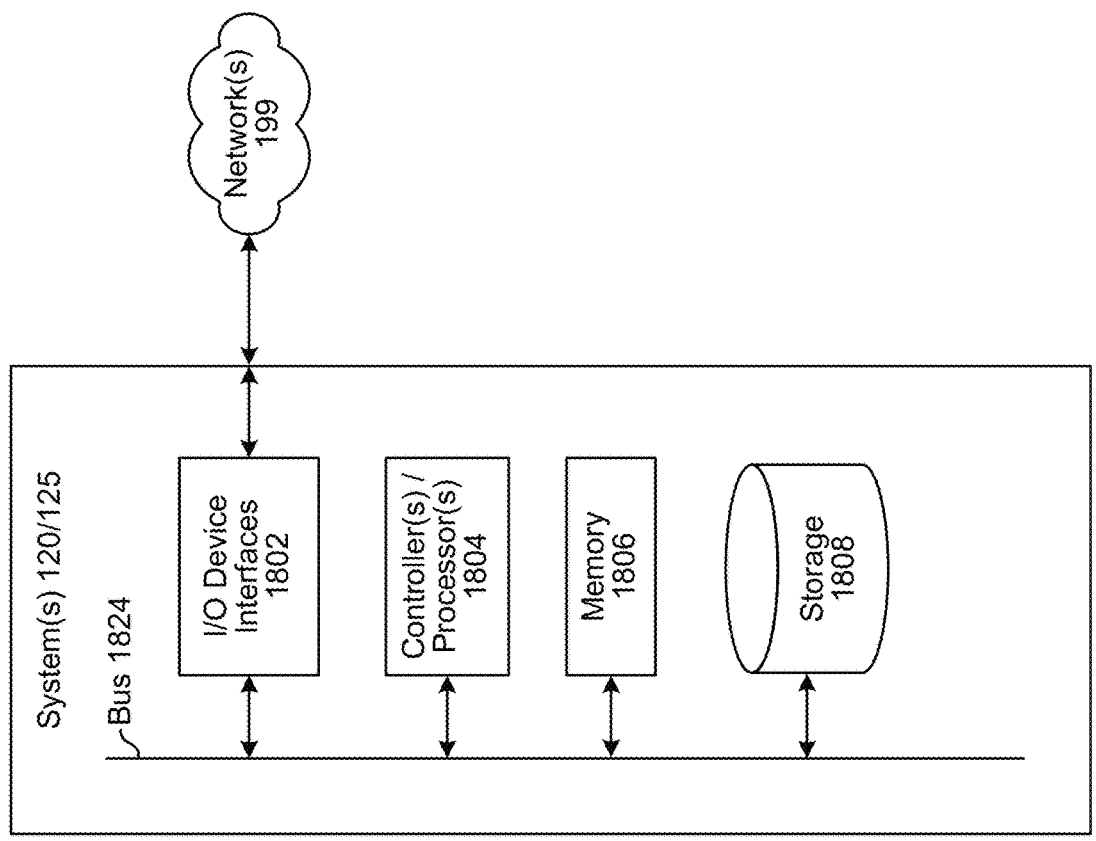

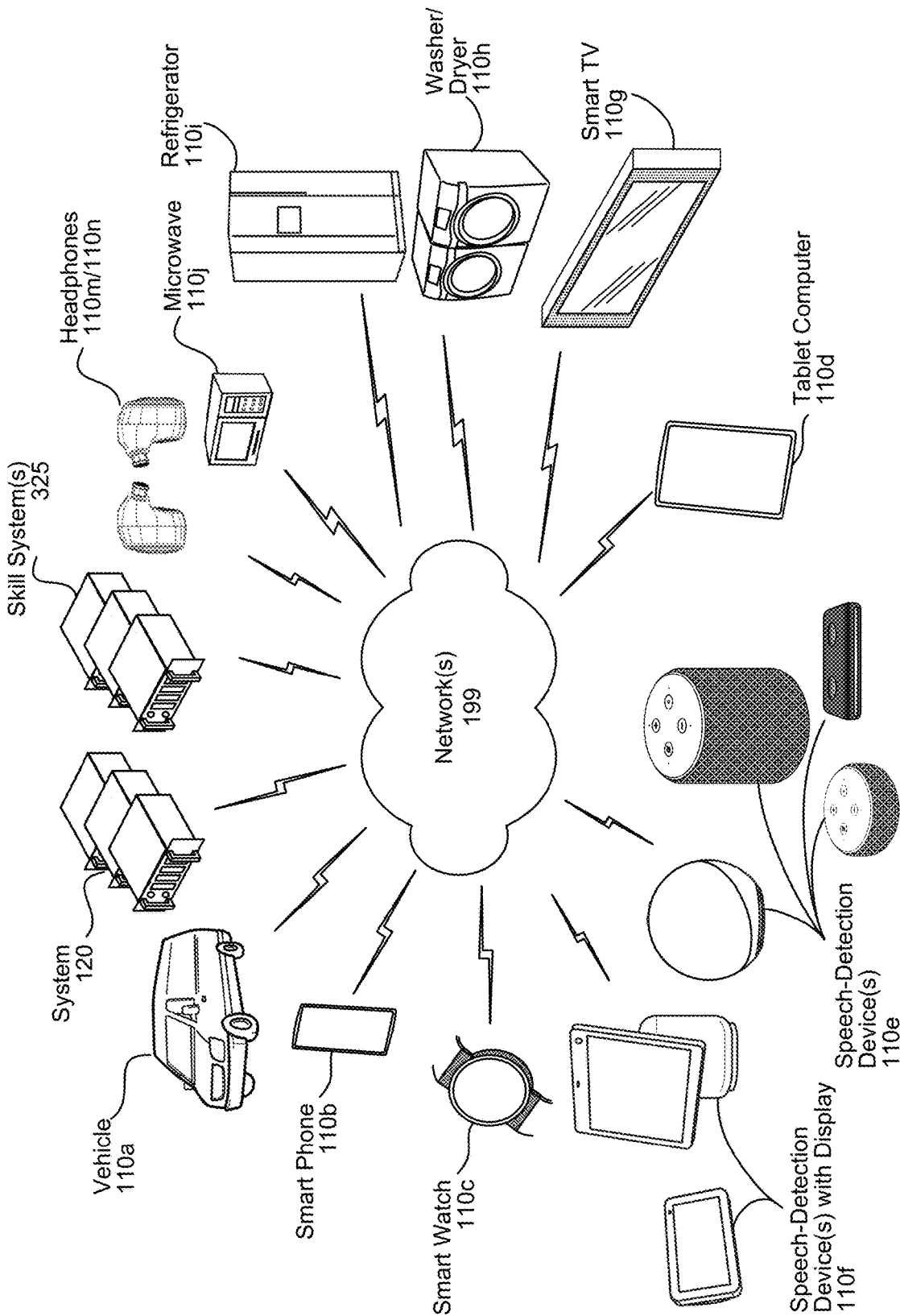

AUTOMATIC SPEECH RECOGNITION

CROSS-REFERENCE TO RELATED APPLICATION DATA

This application claims the benefit of priority of U.S. Provisional Patent Application No. 63/211,722, filed Jun. 17, 2021, and entitled "AUTOMATIC SPEECH RECOGNITION," in the names of Feng-Ju Chang, et al. The above application is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 15 illustrates speech recognition lattices according to one aspect of the present disclosure.

FIG. 18 is a block diagram conceptually illustrating example components of a system, according to embodiments of the present disclosure.

FIG. 19 illustrates an example of a computer network for use with the overall system, according to embodiments of the present disclosure.

DETAILED DESCRIPTION

Figure 1:
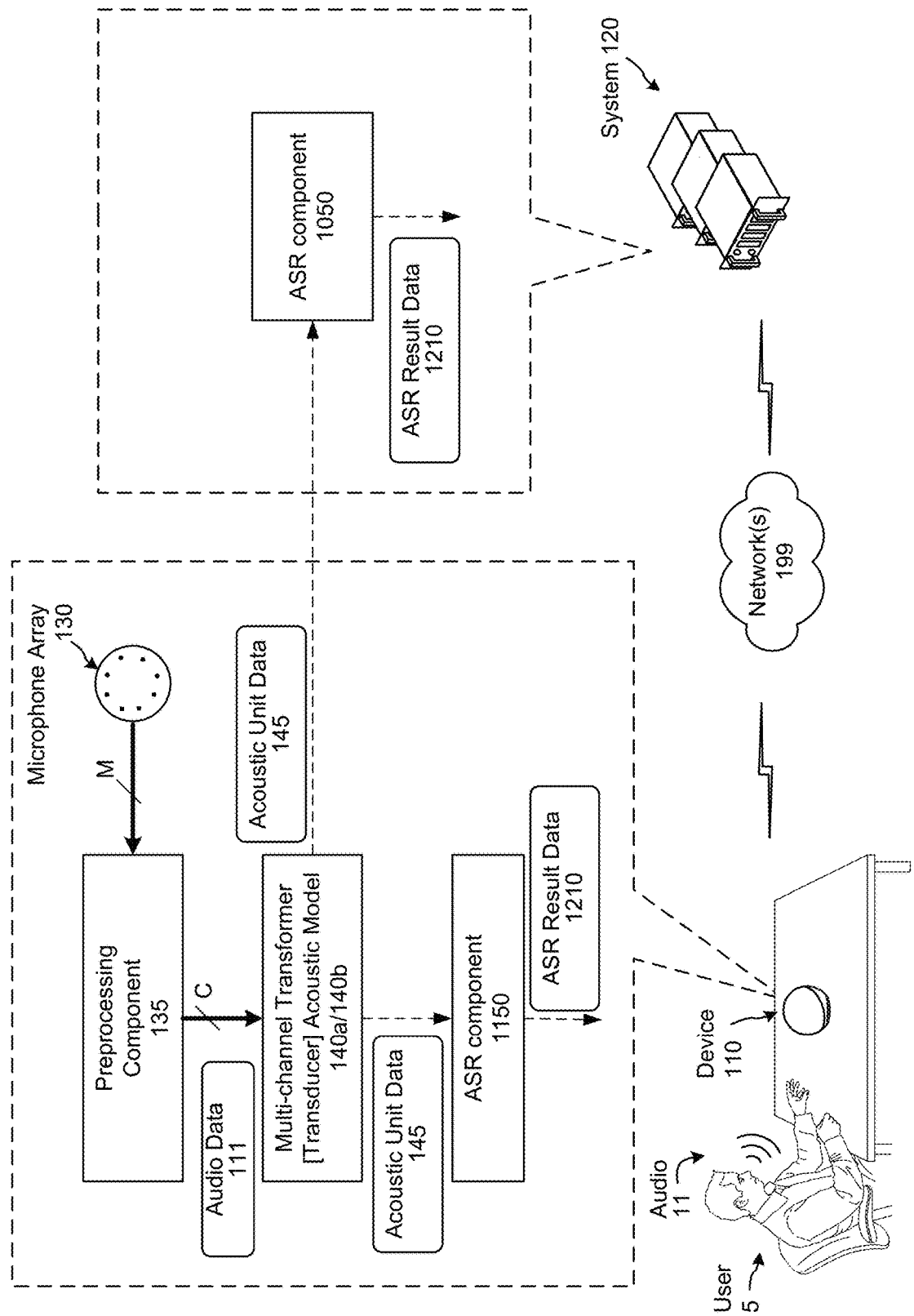
FIG. 1 is a conceptual diagram illustrating example components of a system for using a multi-channel transformer/transducer acoustic model for predicting acoustic units for speech processing according to embodiments of the present disclosure.

Speech processing systems and speech generation systems have been combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system, sometimes referred to as a spoken language understanding (SLU) system. Text-to-speech (TTS) is a field of computer science concerning transforming textual and/or other data into audio data that is synthesized to resemble human speech. ASR, NLU, and TTS may be used together as part of a speech-processing system. The virtual assistant can leverage the speech-processing system as well as additional applications and/or skills to perform tasks for and/or on behalf of the user.

Certain speech processing devices may be located in homes, offices, or other noisy environments and thus may be equipped with multiple microphones (sometimes referred to as a microphone array) that may assist in far-field speech recognition in potentially noisy environments. Such devices may include beamformers, which are components that combine spectral and spatial information of target and interference signals captured from different microphones to isolate audio from one or more different directions (sometimes called "beams") relative to the device. Such components implementing beamforming approaches may also improve speech recognition by focusing processing on audio that results from a specific direction corresponding to a source of speech (e.g., a user). A device may therefore include a beamformer which takes individual audio signals from respective microphones of a microphone array, processes those audio signals to obtain a single signal representative of a particular audio source (for example, a speech source in a certain direction) and sends the single signal for downstream processing, for example ASR processing including acoustic model processing, etc.

Beamformers can come in a variety of different forms. Delay-and-sum and super-directive beamformers can be used for speech recognition applications. Beamformers that use deep neural networks or other machine learning trained components can also be used. Examples of neural beamformers include fixed beamformers (FBF) and adaptive beamformers (ABF) depending on whether the beamforming weights are fixed or varied based on the input signals during inference time. Typically, such beamformers are configured specifically for the devices in which they reside as they may be dependent on number of microphones in an array, relative positions of the microphones, etc.

Such neural beamforming components are typically trained and configured for beamforming purposes without insight into the downstream speech processing that happens using the input audio signals. Other stagewise training considerations may also impact such approaches. For example, the neural mask estimators in ABF methods are usually pre-trained on synthetic data where the target speech and noise labels are well defined. Real-world audio, however, is less well defined, thus resulting in room for continuous improvement. Further, such neural beamformers also output individual audio signals that are then sent to separate speech processing components for ultimate downstream processing by specialized ASR or other components, forming a cascading chain of processing components. Thus training may be stagewise without information from downstream stages used to train the neural beamformers.

End-to-end approaches have been attempted. Such end-to-end approaches may rely on an attention mechanism (encoder-decoder attention) over full encoder outputs to learn alignments between input and output sequences or may encode input audio bi-directionally. Further, certain other approaches use affine transformations to aggregate multi-channel embeddings in cross-channel attention layers, thus resulting in significant model size increases with regard to the number of microphones.

To improve on these components, offered is an end-to-end model and component that is capable of inputting a number of audio signals from microphones of a microphone array and output predictions of acoustic units, thus incorporating acoustic modeling operations into its processing. Such a model may be used with a variety of different devices where the different devices are of different device types with varying numbers and positions of the microphones in their respective microphone arrays. Such a component may use a deep learning model known as a transformer, that uses attention to differentially weigh the various aspects of the input audio data signals. The model may operate with low latency and low computational cost, thus making it more suitable to on-device speech processing than previous techniques.

The model may incorporate an end-to-end, streamable, fully transformer based architecture which can directly output an ASR transcription hypotheses given the multi-channel inputs, without the stage-wise training. In one embodiment the proposed model first projects the acoustic features and word pieces to more discriminative embedding spaces. Channel-wise self-attention layers then take the acoustic embeddings and model the correlations between time frames within a channel. Cross-channel attention layers are used to model the relationships across channels within and across time frames. Finally, a joint network is used to combine the post-attention based acoustic embeddings and word piece embeddings to generate ASR transcription hypotheses in an autoregressive fashion.

Thus offered is a device/system that uses a multi-channel transformer acoustic model using a multi-channel encoder/decoder configuration whether the multi-channel encoder uses channel-wise self-attention and cross-channel attention to encoder input microphone signals. The model may also be a multi-channel transformer transducer acoustic model where the cross-channel attention may use both concatenation and averaging approaches so as to not increase the model size as the number of microphone and input sequence length increase.

The offered multi-channel transformer acoustic model may take as input audio from multiple individual audio signal channels (such as from microphones of a microphone array where each microphone corresponds to a channel) and may output acoustic unit data, thus allowing the multi-channel transformer acoustic model to handle both signal combination operations and acoustic modeling jointly. Further, the offered multi-channel transformer/transducer acoustic model may use attention to not only attend different timeframes (e.g., acoustic features from different timeframes within a single channel) but also to attend across different microphone channels to arrive at acoustic unit data.

The offered multi-channel transformer acoustic model may take as input raw data output from a microphone array and/or data from a microphone array that has been processed in some manner before being sent to the multi-channel transformer acoustic model. For example, raw audio data from a microphone array may be processed into feature vectors or other processed audio data. In another example, a beamformer, such as those described above, may process the microphone data/feature data to determine beamformed audio data which may correspond to one or more directions relative to a device. The number of channels of audio signals input to the multi-channel transformer acoustic model may correspond to the number of microphones of a microphone array, a number of beamformed directions corresponding to a beamformer, or some other number.

FIG. 1 is a conceptual diagram illustrating example components of a system 100 for performing speech processing, according to embodiments of the present disclosure. As shown in FIG. 1, the system 100 may include a first device or system 110 (hereafter "device 110") local to a user 5, and a second device or system 120 (hereafter "system 120") connected across one or more networks 199. Although the figures and discussion of the present disclosure illustrate certain steps in a particular order, the steps described may be performed in a different order (as well as certain steps removed or added) without departing from the present disclosure.

As shown in FIG. 1, a device 110 may capture audio 11 representing an utterance of a user 5. The device 110 may capture the audio 11 using individual microphones of a microphone array 130. The microphone array may have a configurable number of microphones (where M represents the number of microphones) which produce a respective number (e.g., M) of audio signals. Such audio signals may be incorporated in audio data 111. As can be appreciated a number of different microphone array configurations (in terms of both arrangement and number of microphones) may be used in device 110. The teachings herein, particularly with regard to the multi-channel transformer/transducer acoustic model 140 do not depend on the number of position/arrangement of the microphones.

The audio data from the microphone array 130 may be processed by a preprocessing component 135 prior to determining the audio data 111. As shown the microphone array may send M channels of audio signals to the preprocessing component which may then output C channels of audio data 111. In certain embodiments the number of channels C may equal the number of microphones M, though in other embodiments C may be less than or greater than M. In certain embodiments each signal channel of the C channels of audio signals may corresponds to an individual microphone of the microphone array 130. Thus, C microphones results in C audio signal channels (e.g., six microphones results in six audio signal channels) where one particular audio data signal channel C may be mapped to a particular microphone of the microphone array 130. In other embodiments, even though the number of channels C may be the same as the number of microphones M, a particular channel may not necessarily correspond to a single microphone. For example, one channel C may correspond to the audio data from multiple microphones, for example if preprocessing component 135 includes one or more beamformers and the audio data 111 includes C channels corresponding to directions relative to the device 110. The preprocessing component 135 may also include one or more encoders or other processors for purposes of determining feature data corresponding to the microphone signals. Thus the audio data 111 may include C channels of audio feature data representing the microphone data. As noted above, each individual channel C may include audio data corresponding to audio captured by a single microphone or to audio captured by multiple different microphones, depending on the operations of preprocessing component 135.

In certain embodiments the individual audio data channels of the C audio data channels may also correspond to different types of data as they need not necessarily be similar types of data. For example, one audio data channel $C_1$ may represent beamformed data (resulting from processing multiple microphones worth of data) corresponding to a first direction relative to the device, another audio data channel $C_2$ may represent beamformed data (resulting from processing multiple microphones worth of data) corresponding to a different second direction relative to the device, another audio data channel $C_3$ may represent feature data corresponding to a specific microphone $M_1$, another audio data channel $C_4$ may represent feature data corresponding to a different specific microphone $M_2$, another audio data channel $C_5$ may represent raw audio data from a still different specific microphone $M_3$, another audio data channel $C_6$ may represent raw audio data from the first microphone $M_1$, and so forth. As can be appreciated, the specific types of audio data may depend on device configuration, operation of the preprocessing component 135 and configuration of the multi-channel transformer/transducer acoustic model 140. Thus the multi-channel transformer/transducer acoustic model 140 may be configured to operate on a variety of different types of input data.

The device 110 may process audio following detection of a wakeword and/or detection of another indication to begin receiving input; for example, a gesture such as a button press. The device 110 may generate audio data corresponding to the audio 11, and may process the audio data locally and/or send data (e.g., intermediate speech processing data such as acoustic unit data 145 discussed below) to the system 120 for processing. The device 110 may send the audio data 111 to the system 120 via an application installed on the device 110 and associated with the system 120. An example of such an application is the Amazon Alexa application that may be installed on a smart phone, tablet, or the like. The device 110 may process inputs locally and/or request additional processing from the system 120. The device 110 (and/or other devices 110) may respond by performing an action responsive to the audio, such as such as outputting synthesized speech or doing something in the physical world such as actuate a car window or a house light. Examples of various devices 110 are described with reference to FIG. 19, and hardware of an example device 110 is described with reference to FIG. 17. The system 120 may be remote system such as a group of computing components located geographically remote from device 110 but accessible via network 199 (for example, servers accessible via the internet). The system 120 may also include a remote system that is physically separate from device 110 but located geographically close to device 110 and accessible via network 199 (for example a home server located in a same residence as device 110). System 120 may also include some combination thereof, for example where certain components/operations are performed via a home server(s) and others are performed via a geographically remote server(s). An example system 120 is described with reference to FIG. 18.

The audio data 111 sent by the device to the system 120 may include C channels worth of audio data 111 to be processed by the system 120, for example by a multi-channel transformer/transducer acoustic model 140 as described herein. In other embodiments the device 110 may "wake" and begin processing audio data 111 using a multi-channel transformer/transducer acoustic model 140 located on the device and may send the resulting data, for example acoustic unit data 145, to the system 120 for further processing by a system ASR component 1050. In other embodiments the device 110 may process the acoustic unit data 145 using an ASR component 1150 on the device 110. The device-side ASR component 1150 and/or the system-side ASR component 1050 may process the acoustic unit data 145 to determine ASR result data 1210 as described herein. The resulting ASR result data 1210 may be further processed (for example as described herein) by other components (such as an NLU component) to identify and execute a user command or otherwise respond to the utterance represented in the audio 11.

The multi-channel transformer/transducer acoustic model 140 may include a variety of other components in different configurations. One configuration of the multi-channel transformer/transducer acoustic model 140, configuration 140a and components thereof, is shown and discussed below in reference to FIGS. 2-6. Another configuration of the multi-channel transformer/transducer acoustic model 140, referred to as the multi-channel transformer transducer acoustic model 140b, and components thereof, is shown and discussed below in reference to FIGS. 7-8C.

The multi-channel transformer/transducer acoustic model 140 may input multiple channels of audio data 111 and may output acoustic unit data 145. The acoustic unit data 145 may include not only indicators of individual acoustic units (e.g., phonemes, senons, phones, etc.) predicted to be included in the audio 11 represented by the audio data 111, but the acoustic unit data 145 may also include scores/probability data corresponding to the individual acoustic units. Such data may represent a likelihood that a respective acoustic unit was represented in the audio data 111.

Figure 2:
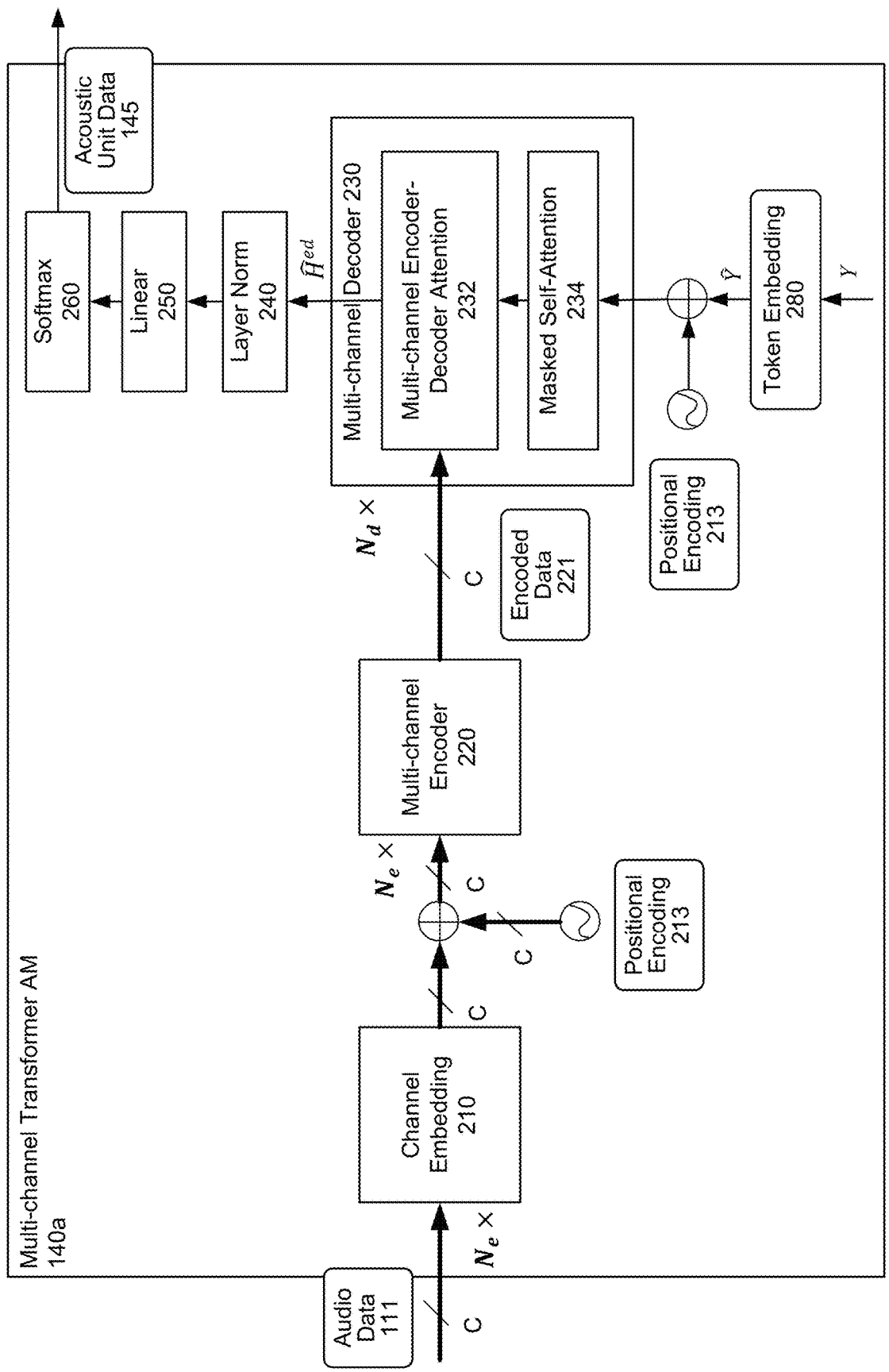
FIG. 2 is a conceptual diagram illustrating components that may be included in a multi-channel transformer acoustic model, according to embodiments of the present disclosure.
Figure 3:
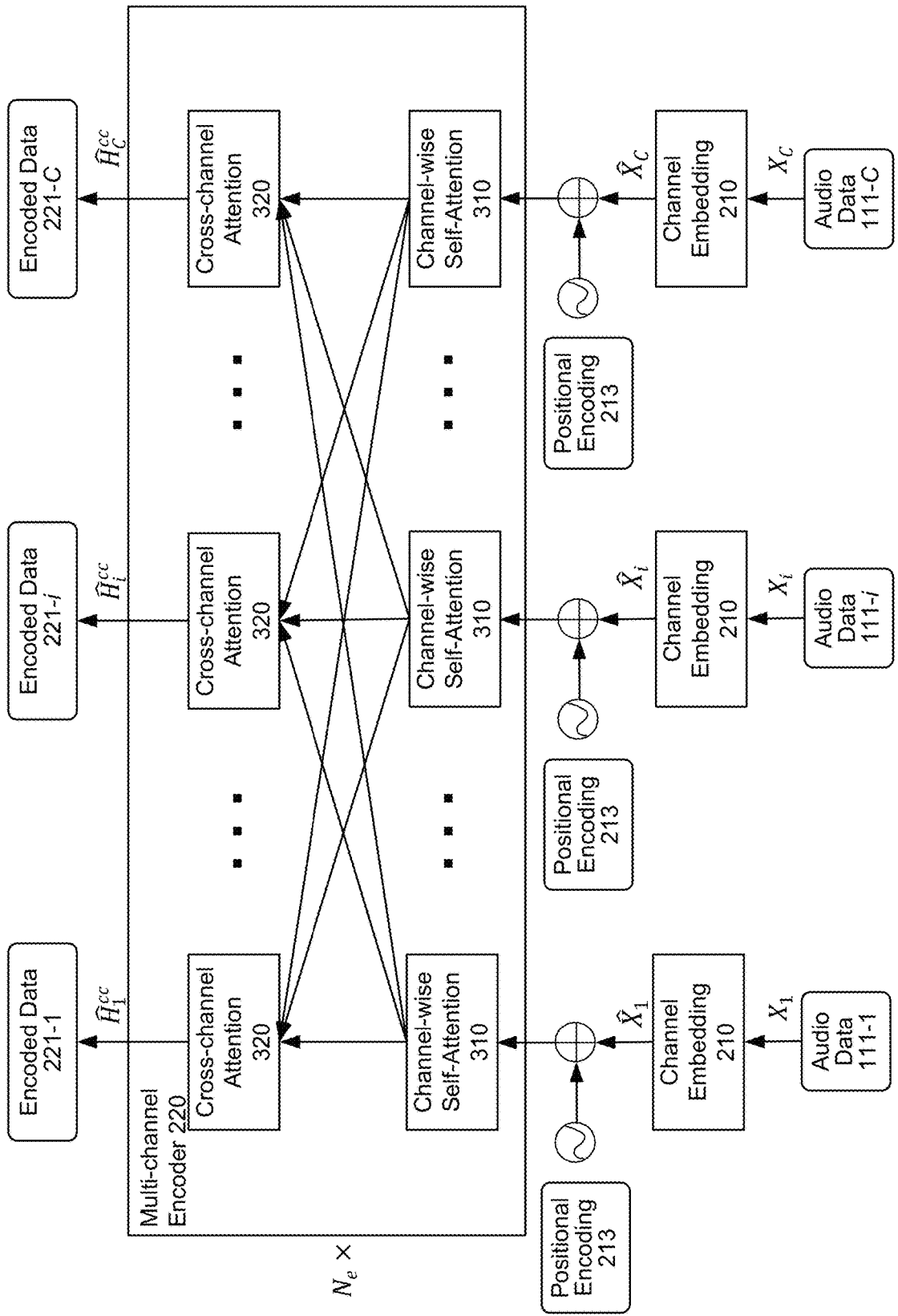
FIG. 3 is a conceptual diagram illustrating various components of a multi-channel encoder as part of a multi-channel transformer acoustic model, according to embodiments of the present disclosure.

As shown in FIG. 2, the multi-channel transformer acoustic model 140a may include a variety of components including a channel embedding component 210, a multi-channel encoder 220, a multi-channel decoder 230, and other components. As shown in FIGS. 2 and 3, the multi-channel encoder 220 may include $N_e$ layers, represented by $N_e$x in FIGS. 2 and 3. As shown in FIG. 2, C channels of audio signals from the audio data 111 are input into the multi-channel transformer acoustic model 140a. Those signals are sent to the channel embedding component 210 which produces C embedded audio signals. Those embedded audio signals are combined with positional encoding data 213 before being input into a multi-channel encoder 220 which in turn performs processing to determine C channels of encoded data 221. FIG. 3 shows further details of these components and operations.

As shown in FIG. 3, each audio signal channel is separately processed by a channel embedding component 210. The individual audio signal channels are shown as $X_1$, $X_i$ and $X_C$ where $X_1$ represents the first channel signal (e.g., the signal from microphone 1, the signal from beam direction 1, or the like depending on the output of the preprocessing component 135), $X_C$ represents the final audio signal (e.g., a signal corresponding to microphone C, the signal from beam direction Z, or the like depending on the output of the preprocessing component 135) and $X_i$ represents the audio signals in between audio channel 1 and audio channel C. For processing by the multi-channel transformer acoustic model 140a, each signal may represent an entire utterance's worth of audio data. For example, $X_1$ may represent the audio 11 of the utterance as represented by channel 1, $X_i$ may represent the audio 11 of the utterance as represented by channel i, and so forth. An endpointer, voice-activity-detector (VAD) or other component of device may distinguish between speech and non-speech/silence/noise and thus may instruct the device 110 when to capture and stop capturing audio for processing as described herein. The audio data 111 (e.g., signals $X_1$ through $X_C$) may thus include the signal data representing the utterance.

Each channel of audio data 111 is processed by a channel embedding component 210. The channel embedding component 210 is trained to determine a representation of the audio data suited for processing by the downstream components of the multi-channel transformer/transducer acoustic model 140. The channel embedding component 210 thus produces embedded audio data signals where certain features are weighted according to how useful they are for the downstream processing. As shown in FIG. 3, $\hat{X}_1$ represents the embedded version of audio signal $X_1$, $\hat{X}_i$ represents the embedded version of audio signal $X_i$ and $\hat{X}_C$ represents the embedded version of audio signal $X_C$. The channel embedding components 210 may perform the same embedding operation for each audio signal. Further, while multiple channel embedding components 210 are illustrated, the device 110 may include only a single such component that is used multiple times as needed. This may be true for other components that are shown multiple times, for example the channel-wise self-attention components 310/712, cross-channel attention components 320/714, or various other components.

The embedded audio are then processed with respect to the positional encoding 213. This positional encoding 213 provides some relative positional data to capture the relationship between frames within the audio data. The positional encoding data 213 may correspond to one or more matrices (e.g., sinusoidal matrices) that encode the positional embedding vector to a particular frame. For example, the device 110 may determine a value for each audio frame where the value of that audio frame is determined based on the length of the entire utterance (e.g., the number of audio frames for the entire utterance). Thus, during processing for audio data for frame t, the value of positional encoding data 213 used for that processing (e.g., for combining with that frame's worth of audio data) will be the encoding value for that frame t. The value for that frame t will be consistent across all channels C relative to the particular channel's data for frame t.

The resulting data is then passed to the channel-wise self-attention component 310 to perform self-attention processing/self-correlation. The individual cross-channel attention components 320 will then take the outputs from the different channel-wise self-attention components 310 to perform attention processing and encode the relationship across the channels. Further operation of the channel-wise self-attention component 310 is described further in reference to FIG. 4.

Figure 4:
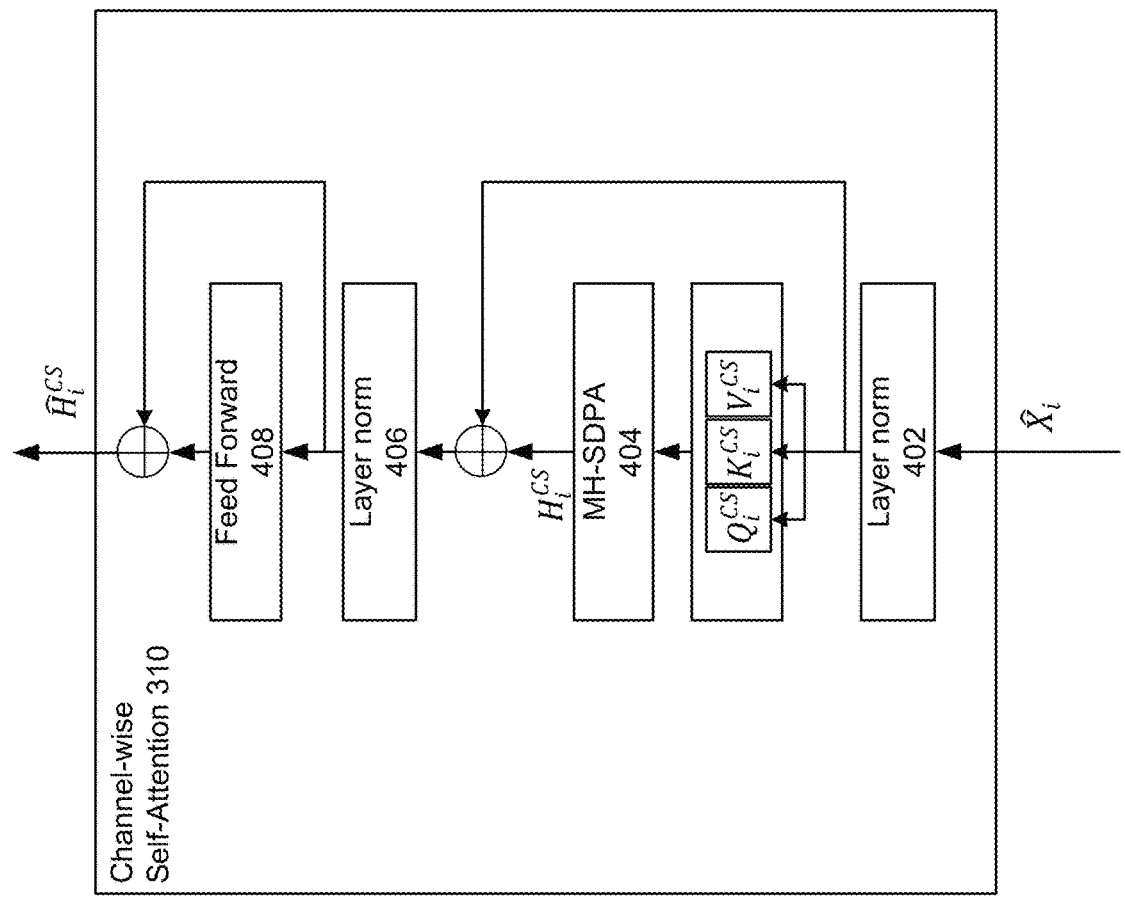
FIG. 4 is a conceptual diagram illustrating a channel-wise self-attention component as part of a multi-channel transformer acoustic model, according to embodiments of the present disclosure.

As shown in FIG. 4, the input data (shown as $\hat{X}_i$ to represent the embedded audio data for signal i, which may be post-processing with respect the positional encoding 213) is normalized by processing through layer norm 402. The output of the layer norm 402 is then fed into a set of learnable weight parameters to create three linear transformations Query ($Q_i^{CS}$), Key ($K_i^{CS}$), and Value ($V_i^{CS}$) which will transform the input audio signal $\hat{X}_i$ into output data to be fed into multi-head scaled dot-product attention (MH-SDPA) layer 404 to obtain the $H_i^{CS}$. The transformations may transform the input audio data $\hat{X}_i$ as follows:

$$Q_i^{CS} = \sigma(\hat{X}_i W^{cs,q} + 1(b_i^{cs,q})^T)$$

$$K_i^{CS} = \sigma(\hat{X}_i W^{cs,k} + 1(b_i^{cs,k})^T)$$

$$V_i^{CS} = \sigma(\hat{X}_i W^{cs,v} + 1(b_i^{cs,v})^T)$$

where W represents a weight matrix with learnable weights for each respective transformation, b represents a bias vector for each respective transformation and σ represents a linear activation, which may be the identity function. Each of the respective channel-wise self-attention weight matrices for the different transforms (e.g., $W^{cs,q}$ for Q, $W^{cs,k}$ for K and $W^{cs,v}$ for V) may be different from each other. The weight/bias values may be determined during training using a cross-entropy loss from ground-truth acoustic unit data 145 (such as that output by softmax 260) to minimize the difference between the ground truth distribution over token probability (as represented in the ground-truth acoustic unit data 145) and back-propagated to learn the weight values of the respective weight matrices.

The resulting transformations will be processed by the MH-SDPA layer 404 to compute layer similarity and determine $H_i^{CS}$ where:

$$H_i^{CS} = \text{Softmax}\left(\frac{Q_i^{CS}(K_i^{CS})^T}{\sqrt{d_m}}\right)V_i^{CS}$$

where $\sqrt{d_m}$ represents a scaling factor to improve numerical stability. This function will transform the input of $\hat{X}_i$ to compute layer similarity. Based on the similarity, the function will weight the transform inputs to encode which frame of the input audio data $\hat{X}_i$ may be more important within the i-th channel and to more highly weight (within transform $V_i^{CS}$) corresponding metrics. Thus the above represents a weighted sum operation and the softmax operation takes the similarity of the acoustic frames in the i-th channel and determines (potentially optimal) weights to obtain $H_i^{CS}$ which represents a desirable weighted representation of the input signal $\hat{X}_i$.

The resulting $H_i^{CS}$ will then be combined with the output from the layer norm 402 and then normalized (using layer norm 406). The resulting data will be passed into a feed forward layer 408 and then combined with the output of that feed forward layer 408 to determine $\hat{H}_i^{CS}$, the output from the channel-wise self-attention component 310 for channel i. As can be appreciated, $\hat{H}_1^{CS}$ will represent the output from the channel-wise self-attention component 310 for channel 1 and $\hat{H}_C^{CS}$ will represent the output from the channel-wise self-attention component 310 for channel C.

Figure 5:
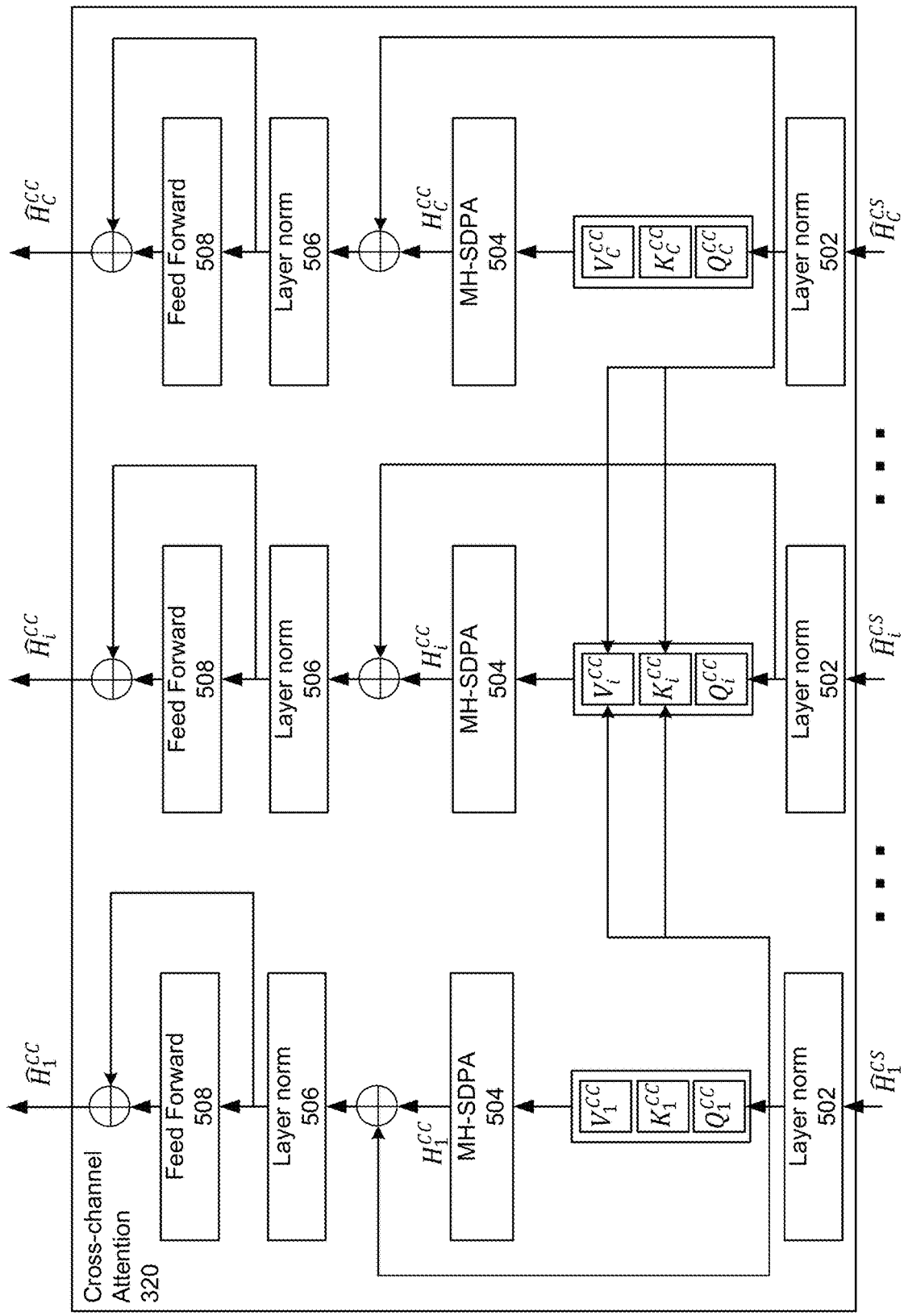
FIG. 5 is a conceptual diagram illustrating a cross-channel attention component as part of a multi-channel transformer acoustic model, according to embodiments of the present disclosure.

As shown in FIGS. 3 and 5, the output from the channel-wise self-attention component 310 for each signal (e.g., $\hat{H}_1^{CS}$ through $\hat{H}_C^{CS}$) will then be sent to each cross-channel attention component 320. The operation of the cross-channel attention component 320 is illustrated in FIG. 5. The cross-channel attention component 320 will take the respective channels' worth of outputs from the channel-wise self-attention component 310 (e.g., $\hat{H}_1^{CS}$ through $\hat{H}_C^{CS}$) and will apply cross-channel attention using those outputs. The outputs will be normalized using layer norm 502. The resulting values will then be used by the cross-channel attention component 320 to create Query ($Q_i^{CC}$), Key ($K_i^{CC}$), and Value ($V_i^{CC}$) transformation matrices for each signal branch. For cross-channel attention purposes, the values of those matrices will be:

$Q_i^{CC} = \sigma(\hat{H}_i^{cs} W^{cc,q} + 1(b_i^{cc,q})^T)$ $K_i^{CC} = \sigma(H^{CCA} W^{cc,k} + 1(b_i^{cs,k})^T)$ $V_i^{CC} = \sigma(H^{CCA} W^{cc,v} + 1(b_i^{cs,v})^T)$ where W represents a weight matrix with learnable weights for each respective transformation, b represents a bias vector for each respective transformation and σ represents a linear activation, which may be the identity function. Each of the respective channel-wise self-attention weight matrices for the different transforms (e.g. $W^{cc,q}$ for Q, $W^{cc,k}$ for K and $W^{cc,v}$ for V) may be different from each other. The weight/bias values may be determined during training, potentially in a similar manner as described above in reference to the weight/bias matrices for the channel-wise self-attention component 310 though the values for the weight/bias matrices may be different for those of the cross-channel attention component 320 than for the channel-wise self-attention component 310. Thus, $W^{cc,q}$ may be different from $W^{cs,q}$, and so forth.

Further:

$$H^{CCA} = \sum_{j, j \neq i} A_j \odot \hat{H}_j^{CS}$$

Thus $H^{CCA}$ represents the sum of the affine transforms (A) from the other channels other than the one being processed (e.g., $A_j \odot \hat{H}_j^{cs}$ for all signal channels 1 through C except for i; represented by j where j≠i). In this manner, each i-th channel may be used to measure how to combine the other channels.

The values of the Q, K, and V may be processed by MH-SDPA layer 504 to determine $H_i^{CC}$ for each signal where:

$$H_i^{CC} = \text{Softmax}\left(\frac{Q_i^{CC}(K_i^{CC})^T}{\sqrt{d_m}}\right)V_i^{CC}$$

This operation will measure the similarity across channels (e.g., the cross-channel similarity).

The resulting $H_i^{CC}$ will then be combined with the output from the layer norm 502 and then normalized (using layer norm 506). The resulting data will be passed into a feed forward layer 508 and then combined with the output of that feed forward layer 508 to determine $\hat{H}_i^{CC}$, the output from the channel-wise self-attention component 320 for channel i. As can be appreciated, $\hat{H}_1^{CC}$ will represent the output from the cross-channel attention component 320 for channel 1 and $\hat{H}_C^{CC}$ will represent the output from the cross-channel attention component 320 for channel C. (Although not illustrated in FIG. 5, the output from the individual channels' layer norm 502 components may be sent to the individual transformation matrices K and V for purposes of the calculations shown above.)

Referring again to FIGS. 2 and 3, as shown, the outputs $\hat{H}_1^{CC}$ through $\hat{H}_C^{CC}$ (which may be referred to as encoded data 221-1 through 221-C) may then be sent to the multi-channel decoder 230, specifically as inputs to the multi-channel encoder-decoder attention component 232. The multi-channel decoder 230 (which may have a number of layers $N_d$, represented by $N_d$x in FIG. 2), may also take as input data representing a prior acoustic token Y. This may be performed in an auto-regressive manner such that when performing processing to determine the acoustic unit data 145 for token Y, the multi-channel transformer/transducer AM may use, as input to token embedding 280, the value for the previously processed token Y−1. (At the beginning of processing of an utterance this token Y−1 may represent a <start of sentence> or similar beginning token and as processing of the utterances is ongoing, the value of Y may be updated to the most recently determined token (e.g., Y−1)). Each token Y may represent a single sub-word acoustic unit (e.g., phoneme, senon, phone, etc.). While the processing of the multi-channel decoder 230 may operate in an auto-regressive manner, the configuration of multi-channel transformer acoustic model 140a may still require all the audio of the utterance to be encoded by multi-channel encoder 220 before processing of the multi-channel decoder 230 may begin.

The tokens for the acoustic units (represented by Y, where Y may comprise a one-hot vector of size S where S is the vocabulary size) may be processed by a token embedding component 280 to determine embedded token data $\hat{Y}$, which represents a specified representation of the token space for purposes of the multi-channel decoder 230. This embedded token data $\hat{Y}$ may be combined with the positional encoding data 213 before being input into the multi-channel decoder 230. Once input, the combined data is processed by the masked self-attention layer 234.

Figure 6:
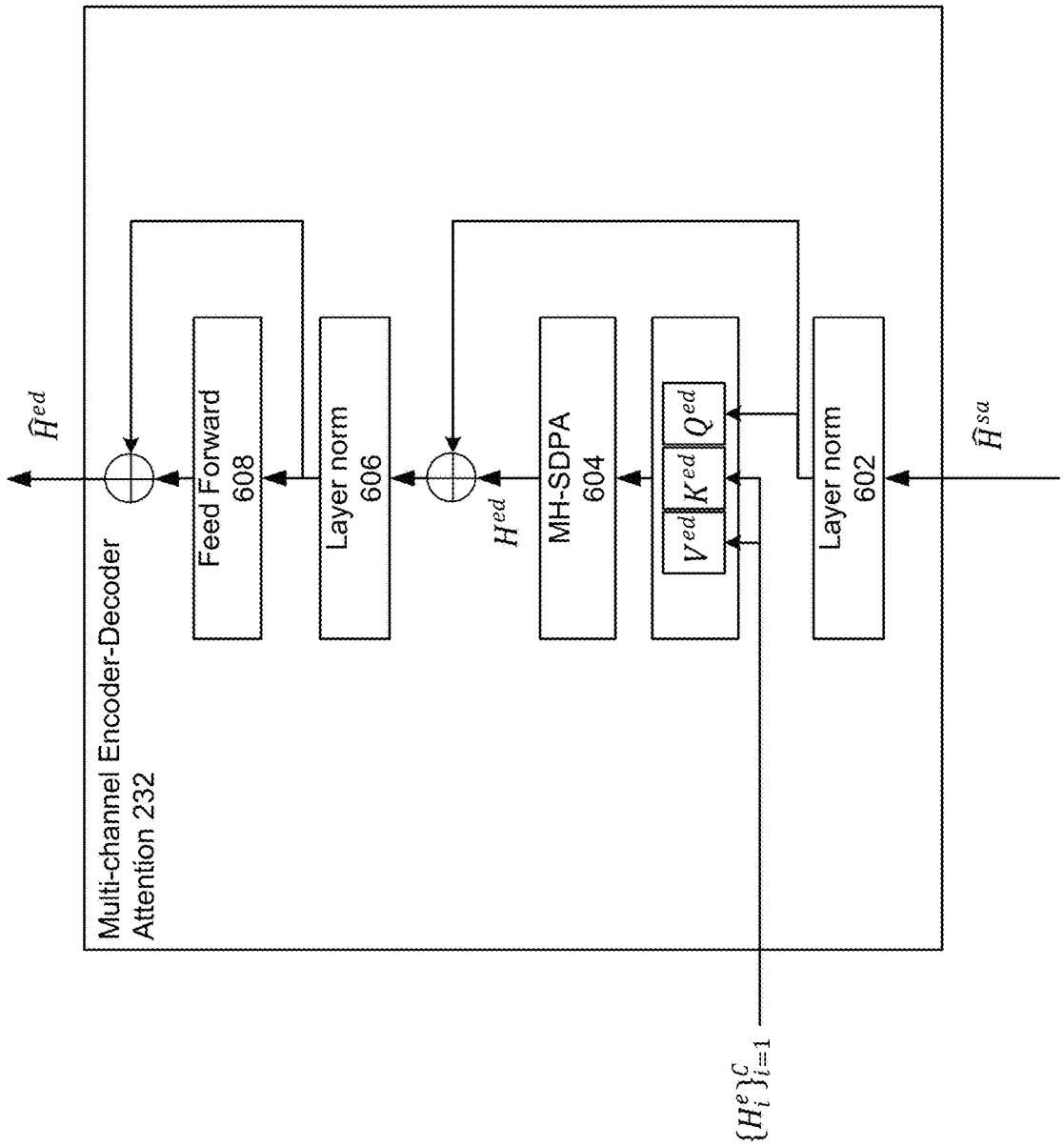
FIG. 6 is a conceptual diagram illustrating a multi-channel encoder-decoder as part of a multi-channel transformer acoustic model, according to embodiments of the present disclosure.

The masked self-attention layer 234, which operates on token data, may operate similarly to channel-wise self-attention layer 310 which operates on audio data, however the processing by masked self-attention layer 234 is "masked" in that the input token data is only attended over tokens determined up until the processing being performed and is performing encoding in an autoregressive manner. Thus, for processing of a token relative to audio at time frame t only tokens that occurred prior to time frame t (e.g., time frames t−1 and earlier) are attended and tokens yet-to-be-determined (e.g., for time frames t+1 and onward) are masked and not considered for self-attention purposes by masked self-attention layer 234. The output of the masked self-attention layer 234 (called $\hat{H}^{sa}$) is then input to the multi-channel encoder-decoder attention component 232 shown in FIG. 6. As shown in FIG. 6, $\hat{H}^{sa}$ (from the masked self-attention layer 234) is normalized by layer norm 602. Also input to the multi-channel encoder-decoder attention component 232 are the attended outputs from the multi-channel encoder, $\hat{H}_1^{CC}$ through $\hat{H}_C^{CC}$ represented in FIG. 6 as $\{H_i^e\}_{i=1}^{C}$ input to the V and K linear transformation blocks. For purposes of the multi-channel encoder-decoder attention component 232, the values of those matrices will be:

$$Q^{ed} = \sigma\left(\hat{H}^{sa} W^{ed,q} + 1\left(b_i^{md,q}\right)^T\right)$$

$$K^{ed} = \sigma\left(\frac{1}{C}\sum_{i=1}^{C} H_i^e W^{ed,k} + 1\left(b_i^{md,k}\right)^T\right)$$

$$V^{ed} = \sigma\left(\frac{1}{C}\sum_{i=1}^{C} H_i^e W^{ed,v} + 1\left(b_i^{md,v}\right)^T\right)$$

where W represents a weight matrix with learnable weights for each respective transformation, b represents a bias vector for each respective transformation and a represents a linear activation, which may be the identity function. Each of the respective channel-wise self-attention weight matrices for the different transforms (e.g. $W^{ed,q}$ for Q, $W^{ed,k}$ for K and $W^{ed,v}$ for V) may be different from each other. The weight/bias values may be determined during training, potentially in a similar manner as described above in reference to the weight/bias matrices for the channel-wise self-attention component 310 though the values for the weight/bias matrices may be different for those of the multi-channel encoder-decoder attention component 232 than for the channel-wise self-attention component 310 and/or the cross-channel attention component 320. Thus, $W^{ed,q}$ may be different from $W^{cs,q}$ and $W^{cc,q}$, etc.

The values of the Q, K, and V may be processed by MH-SDPA layer 604 to determine $H^{ed}$ for each signal where:

$$H^{ed} = \text{Softmax}\left(\frac{Q^{ed}\left(K^{ed}\right)^T}{\sqrt{d_m}}\right)V^{ed}$$

The resulting $H^{ed}$ will then be combined with the output from the layer norm 602 and then normalized (using layer norm 606). The resulting data will be passed into a feed forward layer 608 and then combined with the output of that feed forward layer 608 to determine $\hat{H}^{ed}$, the output of the multi-channel encoder-decoder attention block 232. Returning to FIG. 2, this output $\hat{H}^{ed}$ will be processed by layer norm 240 and linear block 250 then softmax 260 to determine the predicted acoustic unit data 145. This processing by multi-channel decoder 230 (and related components) will continue for the audio data of the utterance to determine the acoustic unit data 145 for the entire utterance. Such data may then be used by downstream components for further speech processing as described herein.

As noted above, the multi-channel transformer acoustic model 140 may take the form of a multi-channel transformer acoustic model 140*a* (discussed above) and multi-channel transformer transducer acoustic model 140*b*. While the configuration and approach of the multi-channel transformer acoustic model 140*a* offers many improvements over the state of the art, one potential drawback to the approach offered above in reference to multi-channel transformer acoustic model 140*a* is that decoder operations (such as those by multi-channel decoder 230) may need to wait until all acoustic frames of the utterance are consumed and processed by the multi-channel encoder 220. Thus the acoustic representation of the audio must be completed before the decoder can attempt to determine the text (including the acoustic sub-word units) matching the audio. The configuration of the multi-channel transformer transducer acoustic model 140*b*, discussed below, may offer an alternative to the multi-channel transformer acoustic model 140*a*. Specifically, operation of multi-channel transformer transducer acoustic model 140*b* may not require processing of the full audio signal of the utterance prior to beginning decoding operations (e.g., determination of text).

Figure 7:
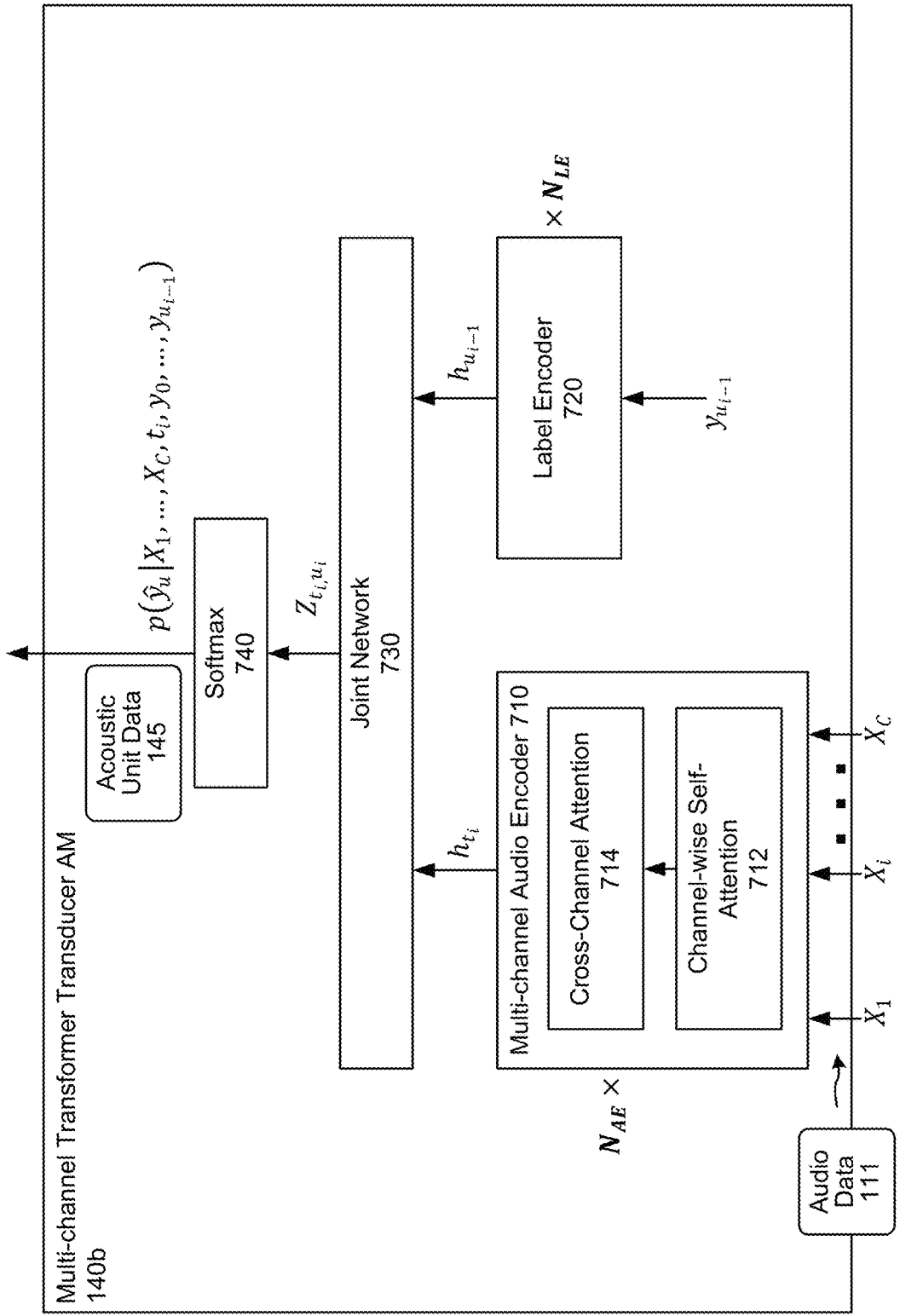
FIG. 7 is a conceptual diagram illustrating various components of a multi-channel transformer transducer acoustic model, according to embodiments of the present disclosure.

Such a multi-channel transformer transducer (MCTT) acoustic model (AM) 140*b* is illustrated in FIG. 7. The MCTT AM 140*b* uses a transducer arrangement in that it creates an output token (e.g., representing an acoustic unit) for each time step worth of audio data (e.g., audio frame) provided as described below. In this manner, the output of the MCTT AM 140*b* may be streamable, that is the acoustic unit data 145 determined by the MCTT AM 140*b* may be output as further audio data 111 is being processed and the MCTT AM 140*b* need not wait for a full utterance's worth of audio data to be encoded in order to start decoding and outputting acoustic unit data 145.

Figure 8A:
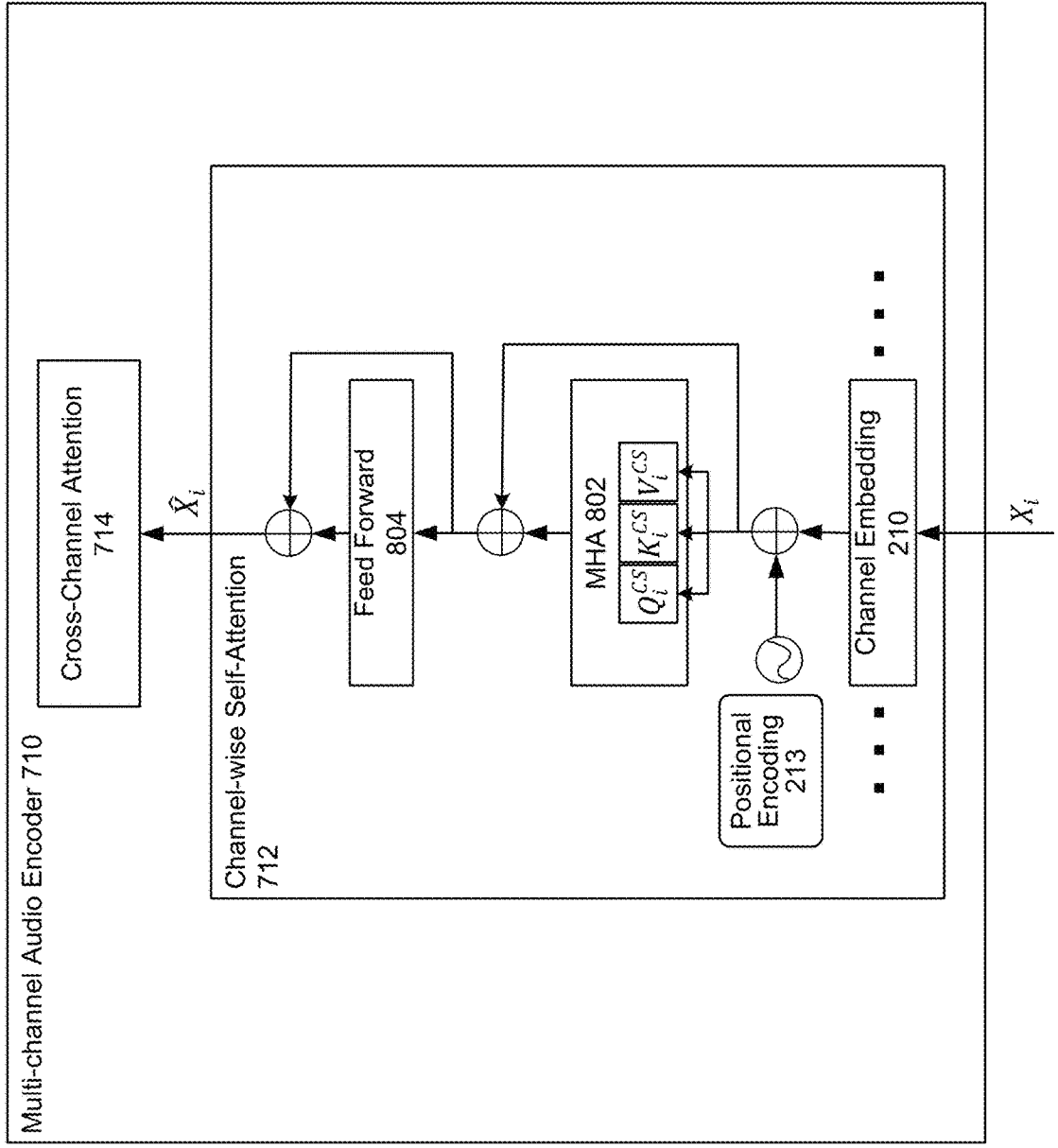
FIG. 8A is a conceptual diagram illustrating a channel-wise self-attention component as part of a multi-channel audio encoder of a multi-channel transformer transducer acoustic model, according to embodiments of the present disclosure.
Figure 8B:
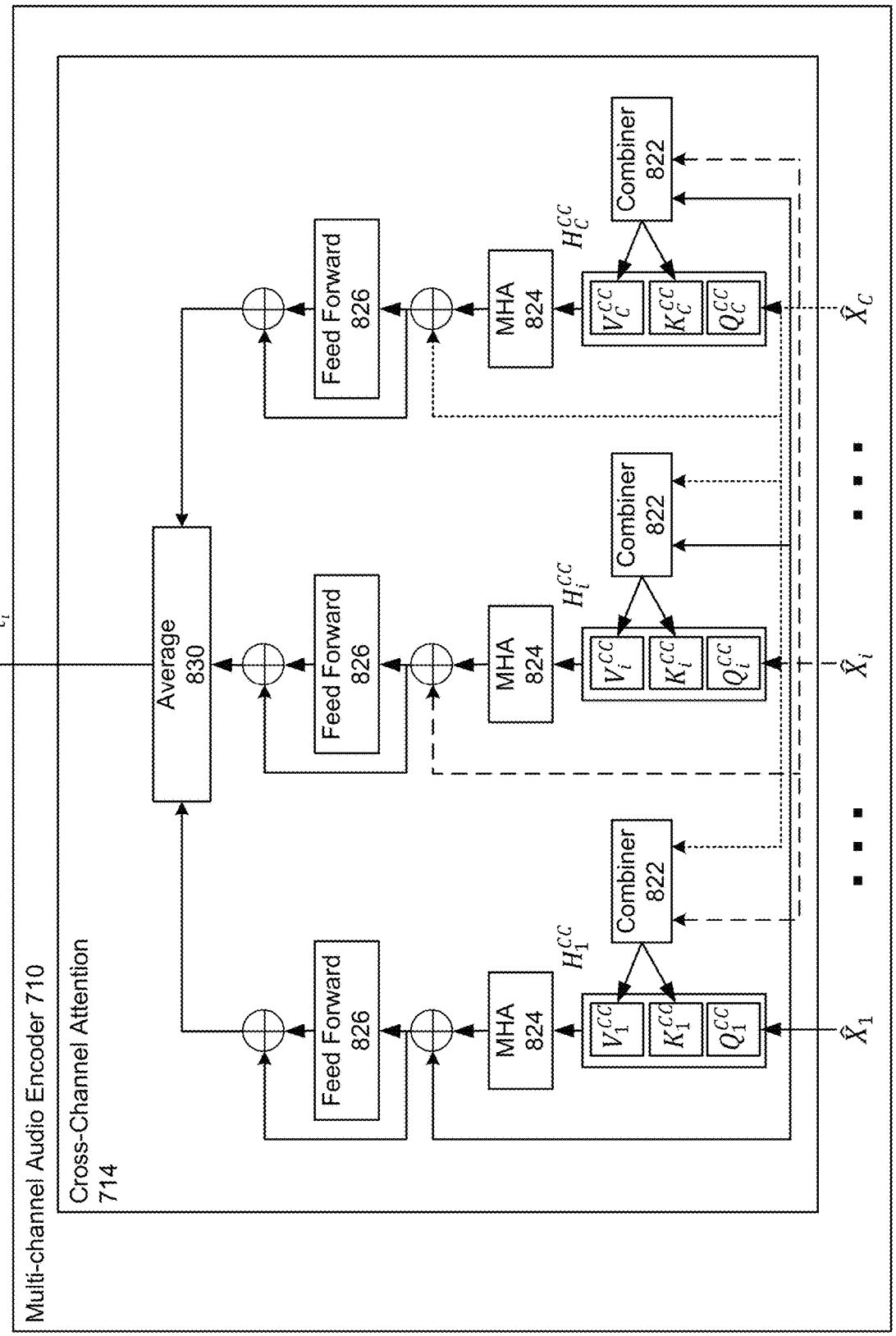
FIG. 8B is a conceptual diagram illustrating a cross-channel attention component as part of a multi-channel audio encoder of a multi-channel transformer transducer acoustic model, according to embodiments of the present disclosure.
Figure 8C:
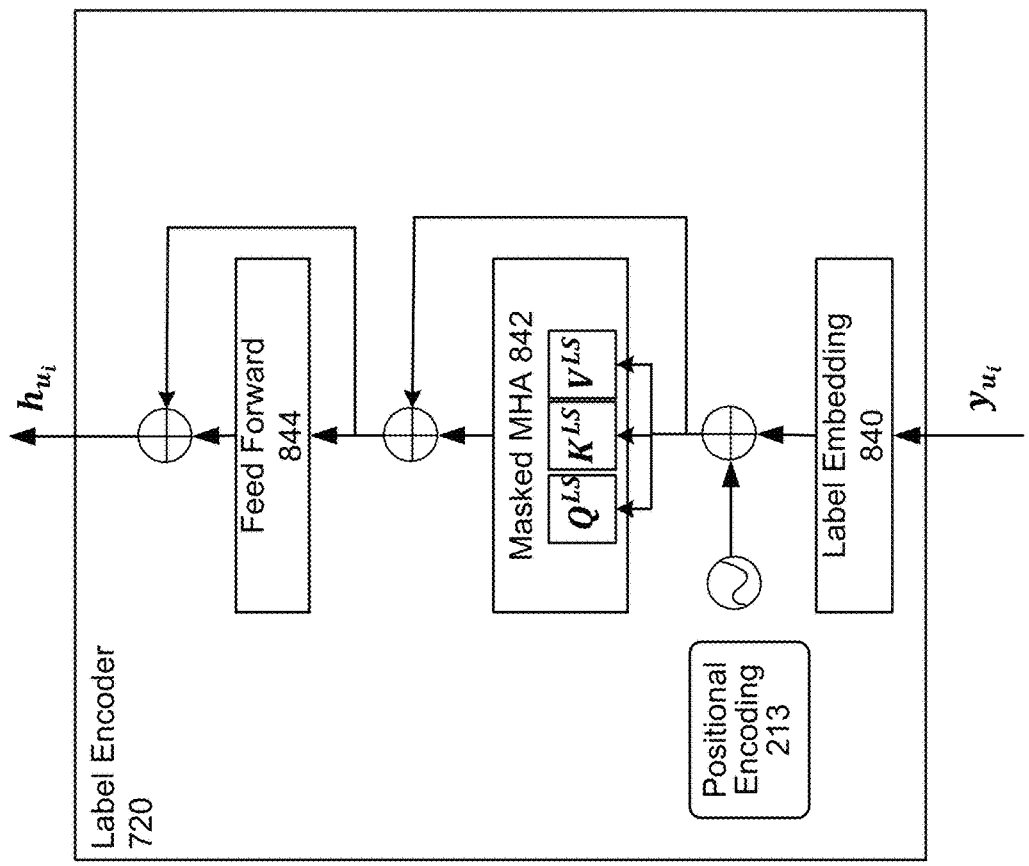
FIG. 8C is a conceptual diagram illustrating a label encoder of a multi-channel transformer transducer acoustic model, according to embodiments of the present disclosure.

As shown in FIG. 7, the MCTT AM 140*b* includes a multi-channel audio encoder 710 which may include $N_{AE}$ channel-wise attention layers 712 and cross-channel attention layers 714 (represented by the $N_{AE}$x in FIG. 7). The components of FIG. 7 are further shown and discussed in reference to FIGS. 8A-8C. In FIGS. 8A-8C normalization may also take place as described above in reference to FIGS. 4-6, but is not shown in FIGS. 8A-8C for ease of illustration.

As shown in FIG. 7, the multi-channel audio encoder 710 takes as input audio data 111 which may include C channels of audio signals $X_1$ through $X_C$. Thus the full input audio data 111 $X = (X_1, \ldots X_i, \ldots X_C)$. Each channel of audio data may have T audio frames. Thus, $X_i = (x_i,1, x_i,2, \ldots x_i,T)$. Each transcription label sequence (e.g., sequence of transcribed acoustic units, 145) of length U may be denoted as $y = (y_1, y_2, \ldots y_U)$ where $y_u \in Z$ and Z is a universe of token labels. As shown in FIG. 7, the audio data is encoded by multi-channel audio encoder 710 to produce encoder states as $h = (h_1, \ldots h_T)$. For each encoder state $h_t$, the MCTT AM 140*b* predicts either a token label for an acoustic unit or a blank symbol (e.g., <b>) with a joint network 730. If the MCTT AM 140*b* predicts a blank symbol, which indicates the lack of a token label for that time step t (out of T), the MCTT AM 140b moves on to the next encoder state. Thus the MCTT AM 140b may consider all audio data for each channel (1 through C) for time step t (which may include a single audio frame (e.g., 25 ms worth of audio data) or some other window worth of audio data) to determine the token for that time step. The transducer model of MCTT AM 140b exploits not only the encoder output at time t but also previous non-blank label history (e.g., $h_{u_{l-1}}$) as inputs to predict the next output. As discussed below, the previous predicted labels (e.g., $y_{u_{l-1}}$) are encoded by label encoder 720 to determine the encoded previously predicted labels (e.g., $h_{u_{l-1}}$).

The MCTT AM 140b defines a conditional distribution as:

$$P(\hat{y}|X) = \prod_{i=1}^{T+U} P(\hat{y}_i | X, t_i, y_0, \ldots, y_{u_{i-1}})$$

where $\hat{y}=(\hat{y}_1, \ldots, \hat{y}_{T+U}) \subset \{Z \cup \langle b \rangle\}^{T+U}$ correspond to any possible alignment path with T blank symbols and U labels such that after removing the blank symbols and in $\hat{y}$ yields y, and $y_0$ is the start of sentence symbol.

$P(\hat{y}|X)$ may be marginalized over all possible alignments $A(X, y)$ to obtain the probability of the target label sequence y given the input multi-channel audio data X such that:

$$P(y|X) = \sum_{\hat{y} \in A(X,y)} P(\hat{y}|X)$$

This alignment probability summation may be computed efficiently with a forward-backward algorithm.

As shown in FIG. 8A, a channel-wise self-attention component 712 may receive audio data for a particular channel $X_i$. The audio data $X_i$ is processed by a channel embedding component 210 to determine embedded audio data. As noted above in reference to FIGS. 2-6, the audio data Xi may be raw microphone audio data or may be audio feature data, such as log-short-time Fourier transform (STFT) and phase features, or other audio feature data. The embedded features plus the positional encoding 213 are fed into a set of learnable weight parameters/linear transforms Query, Key, and Value for channel-wise self-attention component 712 which are similar to those described above with respect to channel-wise self-attention component 310. The transformed features $Q^{cs}$ and $K^{cs}$ are used to compute the correlation across time steps within a channel via the MHA component 802. The resulting attention matrix is then used to reweight the features of $V^{cs}$ in each time step followed by the feed-forward network 804 to produce the self-attention outputs $\hat{X}_i$.

Thus, the resulting output from MHA 802 will be combined with the (normalized) embedded features plus positional encoding 213. The resulting data will be passed into a feed forward layer 804 and then combined with the output of that feed forward layer 804 to determine $\hat{X}_i$, the output from the channel-wise self-attention component 712 for channel i. The self-attended outputs for each channel (e.g., $\hat{X}_1 \ldots \hat{X}_i, \ldots \hat{X}_C$) are then input, as shown in FIG. 8B, to the cross-channel attention component 714. The cross-channel attention layers aim to learn the contextual relationship across channels both within and across time steps. The i-th channel is used to create $Q_i^{CC}$, and the other channels are leveraged by a combiner 822 to create $K_i^{CC}$ and $V_i^{CC}$. Thus, the transformations for the cross-channel attention component 714 may be illustrated as:

$$Q_i^{CC}=\sigma(\hat{X}_i W^{cc,q}+1(b_i^{cc,q})^T)$$

$$K_i^{CC}=\sigma(H_i^{CC} W^{cc,k}+1(b_i^{cs,k})^T)$$

$$V_i^{CC}=\sigma(H_i^{CC} W^{cc,v}+1(b_i^{cs,v})^T)$$

In one difference from the cross-channel attention component 320 discussed above in reference to the multi-channel transformer AM 140a, where the sum of channel encodings is determined after applying affine transformations, the cross-channel attention component 714 of MCTT AM 140b may use one or more combining techniques for combiner 822.

In one embodiment the combiner 822 uses an average of the other (e.g., non-i) channels along both the time and embedding axes, thus:

$$H_i^{CC} = \frac{1}{C} \sum_{j \neq i} \hat{X}_j$$

which may be seen as the symmetric weight case of the above affine combiner discussed with regard to cross-channel attention component 320.

In another embodiment the combiner 822 uses a concatenation function over the channel dimension such that:

$$H_i^{CC}=[\hat{X}_1; \ldots; \hat{X}_j; \ldots; \hat{X}_C]_{j \neq i}$$

Here, $\hat{X}_j \in \mathbb{R}^{T \times d}$ where d is the embedding size. With this adaptation, the model parameters do not increase with regard to the number of microphone channels C and time frames T as in the above arrangement of multi-channel transformer AM 140a, which perform the affine transform operations for all channels that are not i. Thus the model size for MCTT AM 140b may not depend on the number of microphone channels.

The MHA blocks 824 may determine output data similar to the MHA blocks described above, namely:

$$MHA = \text{Softmax}\left(\frac{Q_i^{CC}(K_i^{CC})^T}{\sqrt{d_m}}\right) V_i^{CC}$$

The resulting data from an MHA block 824 will be combined with the attended audio data $\hat{X}_i$, the result of which may be sent to, and combined with the output from, a feed forward layer 826. The outputs from the feed forward layers for all channels will then be sent to an average 830 which may take the mathematical average of all the outputs for each channel. Alternatively, the outputs from the feed forward layers may be combined with a different combination function. The output from the multi-channel audio encoder, $h_{t_i}$ may then be sent to the joint network 730.

As shown in FIG. 7, the joint network 730 may also receive the output from a label encoder 720, shown in more detail in FIG. 8C. The label encoder may have $N_{LE}$ layers (represented by the x $N_{LE}$). An individual token $y_{u_i}$ (which may be $y_{u_{i-1}}$ as the token for a previous time step when performing processing for time step t) may be processed by a label embedding component 840 into vector representations and then combined with positional encoding data 213, the results of which are passed to the linear transformations $Q^{LS}$, $K^{LS}$, and $V^{LS}$ followed by masked MHA computations 842. The resulting combinations and feed forward operations 844, as shown in FIG. 8C, result in label encoder output $h_{u_i}$. MHA 842 may be masked in a manner similarly to self-attention component 234 in that the input token/label data is only attended over tokens/labels determined up until the processing being performed and is performing encoding in an autoregressive manner. Thus, for processing of a token/label relative to audio at time frame t only tokens/labels that occurred prior to time frame t (e.g., time frames t−1 and earlier) are attended and tokens/labels yet-to-be-determined (e.g., for time frames t+1 and onward) are masked and not considered for self-attention purposes by masked MHA 842.

The attention scores from future frames may be masked out to ensure causality. In the configuration of FIG. 7, the label encoder outputs do not attend to multi-channel audio encoder outputs. Instead, as shown, the audio encoding data for time frame t ($h_{t_i}$) and the label encoding data for time frame t−1 ($h_{u_{t-1}}$) and processed by a joint network 730. The joint network may include a fully-connected feed-forward neural network with a single hidden layer and tanh as the activation function. The outputs of the multi-channel audio encoder 710 and label encoder 720 may be concatenated as inputs to the joint network 730. The output of the joint network 730 for time frame i may be expressed as:

$$Z_{t_i,u_i} = \phi(Uh_{t_i} + Vh_{u_{i-1}} + b)$$

where U and V are learnable matrices and b is a learnable vector and $\phi$ is a non-linear activation function. U may represent the token space and V may represent the vocabulary size. These matrices may be used to project the audio and text embeddings into the same dimension for the output Z.

The output of the joint network 730 $Z_{t_i,u_i}$ may be passed to a softmax layer to determine the output probability of a particular token (e.g., the acoustic unit data) (e.g., $\hat{y}_u$) for the multiple channels of audio data (e.g., $\hat{X}_1 \ldots \hat{X}_C$) for a particular time frame i ($t_i$), given the previously determined tokens (e.g., $y_0, \ldots, y_{u_{i-1}}$). Thus, as shown in FIG. 7, the output of the softmax layer may be represented by:

$$p(\hat{y}_u | X_1, \ldots X_C, t_i, y_0, \ldots, y_{u_{i-1}})$$

An indication of the particular output token and the corresponding probability may be output as acoustic unit data 145. Acoustic unit data 145 may also include a series of such output tokens and their corresponding probabilities. Acoustic unit data 145 may also include an N-best list and/or lattice of such output tokens and their corresponding probabilities. The acoustic unit data 145 may then be used for further processing such as language model processing by an ASR component as described herein.

Figure 9:
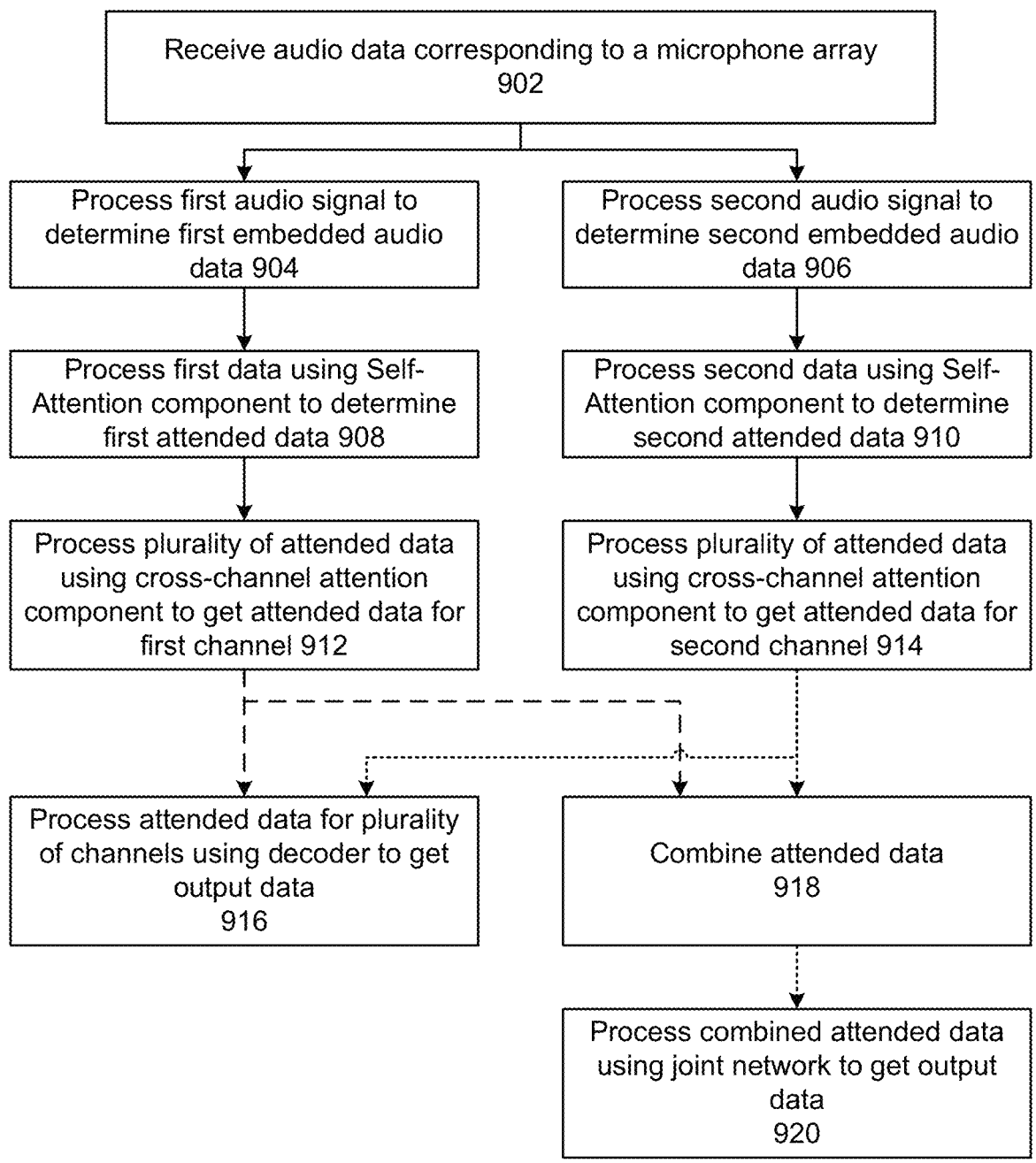
FIG. 9 is a flow diagram illustrating processing audio data using a multi-channel transformer/transducer acoustic model to predict acoustic units for speech processing according to embodiments of the present disclosure.

As shown in FIG. 9, the offered system may receive (902) audio data corresponding to a microphone array, e.g., array 130. The audio data may represent an utterance. The audio data may comprise first audio data corresponding to a first representation of an utterance captured by a first microphone of a microphone array and second audio data corresponding to a second representation of the utterance captured by a second microphone of a microphone array. The audio data may include preprocessed audio data, such as that output by preprocessing component 135. The audio data may comprises embedded audio data. The embedded audio data may have been processed with respect to (for example combined with) positional encoding data, such as positional encoding data 213. The audio data may comprise a plurality of channels of audio signals. Each audio signal channel may, in certain embodiments, correspond to a respective microphone of the microphone array. Thus the plurality of audio signals may include a first audio signal that corresponds to audio detected by a first microphone of the microphone array, and a second audio signal that corresponds to audio detected by a second microphone of the microphone array. The plurality of audio signals may also include other audio signals corresponding to other microphones (e.g., channels) of the microphone array. For example the audio data may represent one or more beamformed audio data channels, one or more feature data channels, etc.

The system may process (904) the first audio signal to determine first embedded audio data. For example, by processing audio data 111-1 with a channel embedding component 210 to determine first embedded audio data. The first embedded audio data may be processed with respect to (for example combined with) positional encoding data, such as positional encoding data 213. The system may process (906) the second audio signal to determine second embedded audio data. For example, by processing audio data 111-i with a channel embedding component 210 to determine second embedded audio data. The second embedded audio data may be processed with respect to (for example combined with) positional encoding data, such as positional encoding data 213.

The system may process (908) first data using a self-attention component to determine first attended data. The first data may include first audio data, which may be the first embedded audio data. The self-attention component may be channel-wise self-attention component 310 as shown in FIG. 4 such that the first attended data comprises $\hat{H}_1^{CS}$ as shown in FIG. 5. The self-attention component may be channel-wise self-attention component 712 as shown in FIG. 8A such that the first attended data comprises $\hat{X}_1$ as shown in FIG. 8B.

The system may process (910) second data using a self-attention component to determine second attended data. The second data may include second audio data, which may be the second embedded audio data. The self-attention component may be channel-wise self-attention component 310 as shown in FIG. 4 such that the second attended data comprises $\hat{H}_C^{CC}$ as shown in FIG. 5. The self-attention component may be channel-wise self-attention component 712 as shown in FIG. 8A such that the second attended data comprises $\hat{X}_C$ as shown in FIG. 8B.

The system may process (912) a plurality of attended data using a cross-channel attention component to get attended data for the first channel. The system may also process (914) a plurality of attended data using a cross-channel attention component to get attended data for the second channel. The plurality of attended data may include the first attended data corresponding to a first microphone of the array (e.g., $\hat{H}_1^{CS}$ from channel-wise self-attention component 310 or $\hat{X}_1$ from channel-wise self-attention component 712) and the second attended data corresponding to a second microphone of the array (e.g., $\hat{H}_C^{CS}$ from channel-wise self-attention component 310 or $\hat{X}_C$ from channel-wise self-attention component 712). The plurality of attended data may also include attended data corresponding to other microphones/channels of the microphone array (e.g., $\hat{H}_i^{CS}$ from channel-wise self-attention component 310 or $\hat{X}_i$ from channel-wise self-attention component 712 where 1<i<C).

The processing using the cross-channel attention component may include processing using cross-channel attention component 320 as described herein. Thus the processing may comprise determining attended data for a particular channel/microphone that involves performing an affine transform using attended data corresponding to the plurality of audio data/audio signals excluding the particular channel in question. Thus for the first channel the affine transform may not involve an audio signal for the first channel; for the second channel the affine transform may not involve an audio signal for the second channel; etc. After determining attended data using the cross-channel attention component 320, the system may process (916) the attended data for the plurality of channels using a decoder to get output data representing at least one acoustic unit of the utterance. This may involve processing the plurality of channels worth of attended data (e.g., output from the cross-channel attention component 320) using a multi-channel decoder (e.g., multi-channel decoder 230) to determine the output data. (Such processing may also involve other components such as layer norm 240, linear component 250, softmax 260, or the like.)

The processing using the cross-channel attention component may include processing using cross-channel attention component 714 as described herein. Thus the processing may comprise determining attended data for a particular channel/microphone that involves combining attended data (for example using combiner 822) corresponding to the plurality of audio data/audio signals excluding the particular channel in question. Thus for the first channel the combining may not involve an audio signal for the first channel; for the second channel the combining may not involve an audio signal for the second channel; etc. The combining may include an averaging of the attended data in question, a concatenation of the attended data in question, or some other combination that does not increase a model size based on a number of microphones in question. The attended data for the plurality of channels may then be combined (918), for example using average 830 shown in FIG. 8B. The combined attended data, which may correspond to a particular time frame (e.g., $h_{t_i}$) may then be processed (920) using a joint network (e.g., joint network 730) to determine output data representing a first acoustic unit of the utterance. (Such processing may also involve other components such as softmax 740, or the like.) The joint network may also process embedded label data (e.g., $h_{u_{i-1}}$), for example as determined by an encoder such as label encoder 720 from embedded data based on a data representing an acoustic unit corresponding to a time frame before the particular time frame (e.g., $y_{u_{i-1}}$ shown in FIG. 8C). After determining the first acoustic unit the system may repeat processes 904-914 to determine attended data corresponding to later portions of the utterance as captured by the microphone array. In this manner the configuration of MCTT AM 140b may not require all the audio data from an utterance to be encoded before determining acoustic units corresponding to (for example earlier) portion(s) of an utterance.

Figure 10:
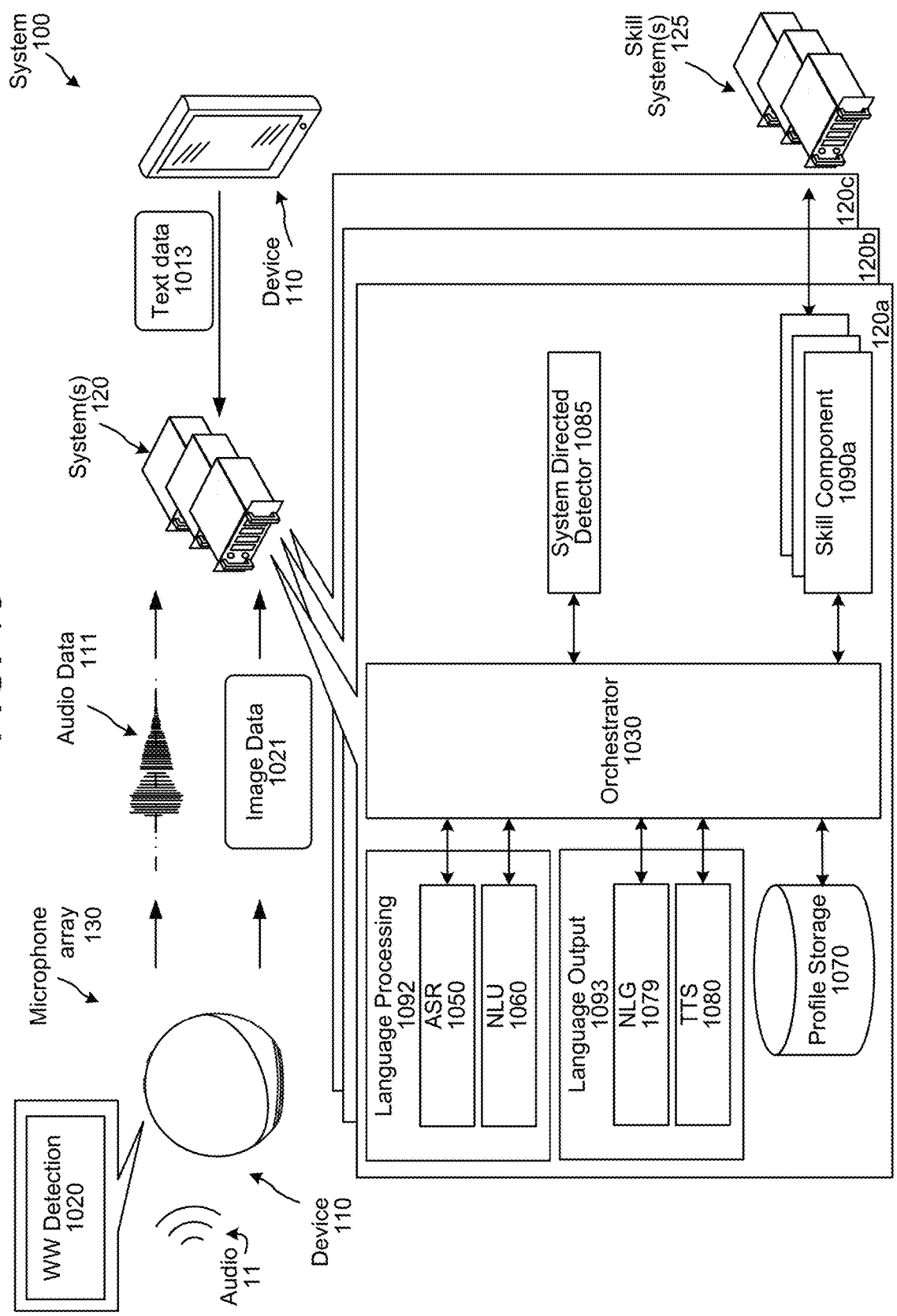
FIG. 10 is a conceptual diagram of components of a speech processing system, according to embodiments of the present disclosure.

The system 100 may operate using various components as described in FIGS. 10 and/or 11. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 1020. The wakeword detection component 1020 may be configured to detect various wakewords. In at least some examples, each wakeword may correspond to a name of a different digital assistant. An example wakeword/digital assistant name is "Alexa." In another example, input to the system may be in form of text data 1013, for example as a result of a user typing an input into a user interface of device 110. Other input forms may include indication that the user has pressed a physical or virtual button on device 110, the user has made a gesture, etc. The device 110 may also capture images using camera(s) 1718 of the device 110 and may send image data 1021 representing those image(s) to the system 120. The image data 1021 may include raw image data or image data processed by the device 110 before sending to the system 120. The image data 1021 may be used in various manners by different components of the system to perform operations such as determining whether a user is directing an utterance to the system, interpreting a user command, responding to a user command, etc.

The wakeword detector 1020 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 1020 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1020 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 1020 and/or input is detected by an input detector, the device 110 may "wake" and begin transmitting audio data 111, representing the audio 11, to the system(s) 120. The audio data 111 may include data corresponding to the wakeword; in other embodiments, the portion of the audio corresponding to the wakeword is removed by the device 110 prior to sending the audio data 111 to the system(s) 120. In the case of touch input detection or gesture based input detection, the audio data may not include a wakeword. The audio data 111 sent by the device to the system 120 may include C channels worth of audio data 111 to be processed by the system 120, for example by a multi-channel transformer/transducer acoustic model 140 as described herein. In other embodiments the device 110 may "wake" and begin processing audio data 111 using a multi-channel transformer/transducer acoustic model 140 located on the device and may send the resulting data, for example acoustic unit data 145, to the system 120 for further processing. In other embodiments the device 110 may process the acoustic unit data 145 using an ASR component on the device 110.

In some implementations, the system 100 may include more than one system 120. The systems 120 may respond to different wakewords and/or perform different categories of tasks. Each system 120 may be associated with its own wakeword such that speaking a certain wakeword results in audio data be sent to and processed by a particular system. For example, detection of the wakeword "Alexa" by the wakeword detector 1020 may result in sending audio data to system 120a for processing while detection of the wakeword "Computer" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 1090 of one or more systems 120.

The device 110 may also include a system directed input detector 1185. (The system 120 may also include a system directed input detector 1085 which may operate in a manner similar to system directed input detector 1185.) The system directed input detector 1185 may be configured to determine whether an input to the system (for example speech, a gesture, etc.) is directed to the system or not directed to the system (for example directed to another user, etc.). The system directed input detector 1185 may work in conjunction with the wakeword detector 1020. If the system directed input detector 1185 determines an input is directed to the system, the device 110 may "wake" and begin sending data for further processing (for example, processing audio data using the language processing 1092/1192, processing captured image data using image processing component 1040/1140 or the like). If data is being processed the device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1185 determines an input is not directed to the system (such as a speech or gesture directed to another user) the device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1185 is determining whether an input is potentially device directed. For example, the system may output an orange indicator while considering an input, and may output a green indicator if a system directed input is detected. Other such configurations are possible. Further details regarding the system directed input detector 1185 are included below with regard to FIG. 15.

Upon receipt by the system(s) 120, the audio data 111 may be sent to an orchestrator component 1030. The orchestrator component 1030 may include memory and logic that enables the orchestrator component 1030 to transmit various pieces and forms of data to various components of the system, as well as perform other operations as described herein.

The orchestrator component 1030 may send the audio data 111 to a language processing component 1092. The language processing component 1092 (sometimes also referred to as a spoken language understanding (SLU) component) includes an automatic speech recognition (ASR) component 1050 and a natural language understanding (NLU) component 1060. The ASR component 1050 may transcribe the audio data 111 into text data. The text data output by the ASR component 1050 represents one or more than one (e.g., in the form of an N-best list) ASR hypotheses representing speech represented in the audio data 111. The ASR component 1050 interprets the speech in the audio data 111 based on a similarity between the audio data 111 and pre-established language models. For example, the ASR component 1050 may compare the audio data 111 with models for sounds (e.g., acoustic units such as phonemes, senons, phones, etc.) and sequences of sounds to identify words that match the sequence of sounds of the speech represented in the audio data 111. To do this, the ASR component 1050 may use acoustic unit data 145 output by the multi-channel transformer/transducer acoustic model 140 as described herein. The ASR component 1050 sends the output data generated thereby 1210 (which may include text data) to an NLU component 1060, via, in some embodiments, the orchestrator component 1030. The ASR results data 1210 sent from the ASR component 1050 to the NLU component 1060 may include a single top-scoring ASR hypothesis or may include an N-best list including multiple top-scoring ASR hypotheses. An N-best list may additionally include a respective score associated with each ASR hypothesis represented therein. The ASR component 1050 is described in greater detail below with regard to FIGS. 12A and 12B.

The speech processing system 1092 may further include a NLU component 1060. The NLU component 1060 may receive the text data from the ASR component. The NLU component 1060 may attempts to make a semantic interpretation of the phrase(s) or statement(s) represented in the text data input therein by determining one or more meanings associated with the phrase(s) or statement(s) represented in the text data. The NLU component 1060 may determine an intent representing an action that a user desires be performed and may determine information that allows a device (e.g., the device 110, the system(s) 120, a skill component 1090, a skill system(s) 125, etc.) to execute the intent. For example, if the text data corresponds to "play the $5^{th}$ Symphony by Beethoven," the NLU component 1060 may determine an intent that the system output music and may identify "Beethoven" as an artist/composer and "$5^{th}$ Symphony" as the piece of music to be played. For further example, if the text data corresponds to "what is the weather," the NLU component 1060 may determine an intent that the system output weather information associated with a geographic location of the device 110. In another example, if the text data corresponds to "turn off the lights," the NLU component 1060 may determine an intent that the system turn off lights associated with the device 110 or the user 5. However, if the NLU component 1060 is unable to resolve the entity—for example, because the entity is referred to by anaphora such as "this song" or "my next appointment"—the speech processing system 1092 can send a decode request to another speech processing system 1092 for information regarding the entity mention and/or other context related to the utterance. The speech processing system 1092 may augment, correct, or base results data upon the audio data 111 as well as any data received from the other speech processing system 1092.

The NLU component 1060 may return NLU results data (which may include tagged text data, indicators of intent, etc.) back to the orchestrator 1030. The orchestrator 1030 may forward the NLU results data to a skill component(s) 1090. If the NLU results data includes a single NLU hypothesis, the NLU component 1060 and the orchestrator component 1030 may direct the NLU results data to the skill component(s) 1090 associated with the NLU hypothesis. If the NLU results data includes an N-best list of NLU hypotheses, the NLU component 1060 and the orchestrator component 1030 may direct the top scoring NLU hypothesis to a skill component(s) 1090 associated with the top scoring NLU hypothesis. The system may also include a post-NLU ranker which may incorporate other information to rank potential interpretations determined by the NLU component 1060. The local device 110 may also include its own post-NLU ranker A skill component may be software running on the system(s) 120 that is akin to a software application. That is, a skill component 1090 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 1090. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 1090 may operate in conjunction between the system(s) 120 and other devices, such as the device 110, in order to complete certain functions. Inputs to a skill component 1090 may come from speech processing interactions or through other interactions or input sources. A skill component 1090 may include hardware, software, firmware, or the like that may be dedicated to a particular skill component 1090 or shared among different skill components 1090.

A skill support system(s) 125 may communicate with a skill component(s) 1090 within the system(s) 120 and/or directly with the orchestrator component 1030 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 1090 dedicated to interacting with the skill support system(s) 125. Unless expressly stated otherwise, reference to a skill, skill device, or skill component may include a skill component 1090 operated by the system(s) 120 and/or skill operated by the skill support system(s) 125. Moreover, the functionality described herein as a skill or skill may be referred to using many different terms, such as an action, bot, app, or the like. The skill 1090 and or skill support system(s) 125 may return output data to the orchestrator 1030.

The system 120 includes a language output component 1093. The language output component 1093 includes a natural language generation (NLG) component 1079 and a text-to-speech (TTS) component 1080. The NLG component 1079 can generate text for purposes of TTS output to a user. For example the NLG component 1079 may generate text corresponding to instructions corresponding to a particular action for the user to perform. The NLG component 1079 may generate appropriate text for various outputs as described herein. The NLG component 1079 may include one or more trained models configured to output text appropriate for a particular input. The text output by the NLG component 1079 may become input for the TTS component 1080. Alternatively or in addition, the TTS component 1080 may receive text data from a skill 1090 or other system component for output.

The NLG component 1079 may include a trained model. The NLG component 1079 generates text data from dialog data received by a dialog manager such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$."

The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 1080.

The TTS component 1080 may generate audio data (e.g., synthesized speech) from text data using one or more different methods. Text data input to the TTS component 1080 may come from a skill component 1090, the orchestrator component 1030, or another component of the system. In one method of synthesis called unit selection, the TTS component 1080 matches text data against a database of recorded speech. The TTS component 1080 selects matching units of recorded speech and concatenates the units together to form audio data. In another method of synthesis called parametric synthesis, the TTS component 1080 varies parameters such as frequency, volume, and noise to create audio data including an artificial speech waveform. Parametric synthesis uses a computerized voice generator, sometimes called a vocoder.

The device 110 may include still image and/or video capture components such as a camera or cameras to capture one or more images. The device 110 may include circuitry for digitizing the images and/or video for transmission to the system(s) 120 as image data. The device 110 may further include circuitry for voice command-based control of the camera, allowing a user 5 to request capture of image or video data. The device 110 may process the commands locally or send audio data 111 representing the commands to the system(s) 120 for processing, after which the system(s) 120 may return output data that can cause the device 110 to engage its camera.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 1070 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user is providing the system 120 with permission to allow the skill to execute with respect to the user's natural language user inputs. If a user does not enable a skill, the system 120 may not invoke the skill to execute with respect to the user's natural language user inputs.

The profile storage 1070 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 1070 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 11:
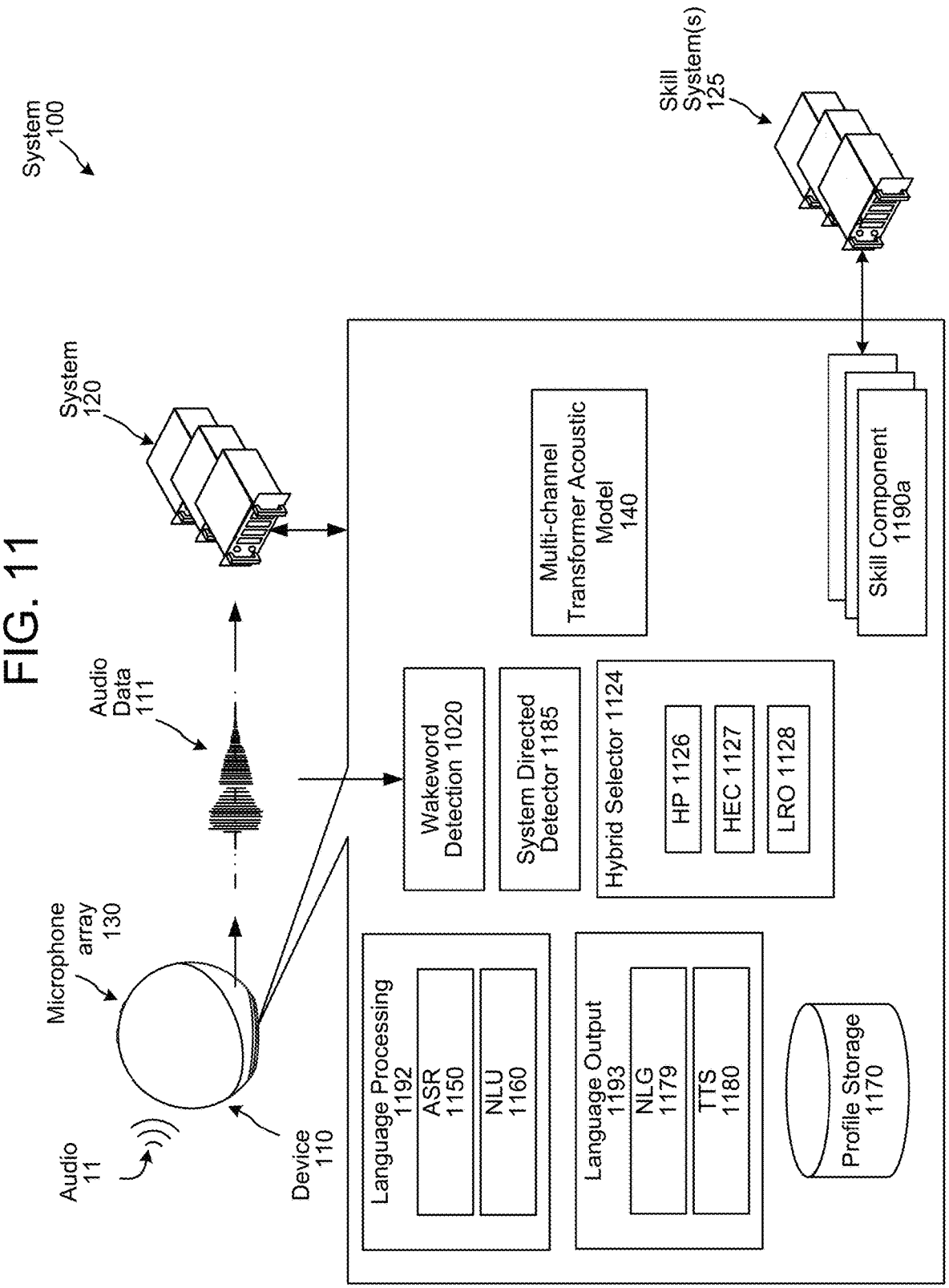
FIG. 11 is a conceptual diagram illustrating components that may be included in a device, according to embodiments of the present disclosure.

Although the components of FIG. 10 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 11 illustrates such a configured device 110.

In at least some embodiments, the system 120 may receive the audio data 111 from the device 110, to recognize speech corresponding to a spoken input in the received audio data 111, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 1180) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

As noted with respect to FIG. 10, the device 110 may include a wakeword detection component 1020 configured to compare the audio data 111 to stored models used to detect a wakeword (e.g., "Alexa") that indicates to the device 110 that the audio data 111 is to be processed for speech processing which may include determining ASR output data, determining NLU output data (e.g., slot data that corresponds to a named entity, label data, and/or intent data, etc.), etc. In at least some embodiments, a hybrid selector 1124, of the device 110, may send the audio data 111 to the wakeword detection component 1020. If the wakeword detection component 1020 detects a wakeword in the audio data 111, the wakeword detection component 1020 may send an indication of such detection to the hybrid selector 1124. In response to receiving the indication, the hybrid selector 1124 may send the audio data 111 to the system 120 and/or the ASR component 1150. The wakeword detection component 1020 may also send an indication, to the hybrid selector 1124, representing a wakeword was not detected. In response to receiving such an indication, the hybrid selector 1124 may refrain from sending the audio data 111 to the system 120, and may prevent the ASR component 1150 from further processing the audio data 111. In this situation, the audio data 111 can be discarded.

The device 110 may conduct its own speech processing using on-device language processing components, such as an SLU/language processing component 1192 (which may include an ASR component 1150 and an NLU 1160), similar to the manner discussed herein with respect to the SLU component 1092 (or ASR component 1050 and the NLU component 1060) of the system 120. Language processing component 1192 may operate similarly to language processing component 1092, ASR component 1150 may operate similarly to ASR component 1050 and NLU component 1160 may operate similarly to NLU component 1060. The device 110 may also internally include, or otherwise have access to, other components such as one or more skill components 1190 capable of executing commands based on NLU output data or other results determined by the device 110/system 120 (which may operate similarly to skill components 1090), profile storage 1170 (configured to store similar profile data to that discussed herein with respect to the profile storage 1070 of the system 120), or other components. In at least some embodiments, the profile storage 1170 may only store profile data for a user or group of users specifically associated with the device 110. Similar to as described above with respect to skill component 1090, a skill component 1190 may communicate with a skill system(s) 125. The device 110 may also have its own language output component 1193 which may include NLG component 1179 and TTS component 1180. Language output component 1193 may operate similarly to language processing component 1093, NLG component 1179 may operate similarly to NLG component 1079 and TTS component 1180 may operate similarly to TTS component 1080.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 1124, of the device 110, may include a hybrid proxy (HP) 1126 configured to proxy traffic to/from the system 120. For example, the HP 1126 may be configured to send messages to/from a hybrid execution controller (HEC) 1127 of the hybrid selector 1124. For example, command/directive data received from the system 120 can be sent to the HEC 1127 using the HP 1126. The HP 1126 may also be configured to allow the audio data 111 to pass to the system 120 while also receiving (e.g., intercepting) this audio data 111 and sending the audio data 111 to the HEC 1127.

In at least some embodiments, the hybrid selector 1124 may further include a local request orchestrator (LRO) 1128 configured to notify the ASR component 1150 about the availability of new audio data 111 that represents user speech, and to otherwise initiate the operations of local language processing when new audio data 111 becomes available. In general, the hybrid selector 1124 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 111 is received, the HP 1126 may allow the audio data 111 to pass through to the system 120 and the HP 1126 may also input the audio data 111 to the on-device ASR component 1150 by routing the audio data 111 through the HEC 1127 of the hybrid selector 1124, whereby the LRO 1128 notifies the ASR component 1150 of the audio data 111. At this point, the hybrid selector 1124 may wait for response data from either or both of the system 120 or the local language processing components. However, the disclosure is not limited thereto, and in some examples the hybrid selector 1124 may send the audio data 111 only to the local ASR component 1150 without departing from the disclosure. For example, the device 110 may process the audio data 111 locally without sending the audio data 111 to the system 120.

The local ASR component 1150 is configured to receive the audio data 111 from the hybrid selector 1124, and to recognize speech in the audio data 111, and the local NLU component 1160 is configured to determine a user intent from the recognized speech, and to determine how to act on the user intent by generating NLU output data which may include directive data (e.g., instructing a component to perform an action). Such NLU output data may take a form similar to that as determined by the NLU component 1060 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 1160) may be selected as usable to respond to a natural language user input, and local response data may be sent (e.g., local NLU output data, local knowledge base information, internet search results, and/or local directive data) to the hybrid selector 1124, such as a "ReadyToExecute" response. The hybrid selector 1124 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 111 to the system 120, and the response data from the system 120 may include the unique identifier to identify which natural language user input the response data corresponds.

In at least some embodiments, the device 110 may include, or be configured to use, one or more skill components 1190 that may work similarly to the skill component(s) 1090 implemented by the system 120. The skill component(s) 1190 may correspond to one or more domains that are used in order to determine how to act on a spoken input in a particular way, such as by outputting a directive that corresponds to the determined intent, and which can be processed to implement the desired operation. The skill component(s) 1190 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 1190, a skill system 125, or a combination of a skill component 1190 and a corresponding skill system 125.

Similar to the manner discussed with regard to FIG. 10, the local device 110 may be configured to recognize multiple different wakewords and/or perform different categories of tasks depending on the wakeword. Such different wakewords may invoke different processing components of local device 110 (not illustrated in FIG. 11). For example, detection of the wakeword "Alexa" by the wakeword detector 1020 may result in sending audio data to certain language processing components 1192/skills 1190 for processing while detection of the wakeword "Computer" by the wakeword detector may result in sending audio data different language processing components 1192/skills 1190 for processing.

Figure 12A:
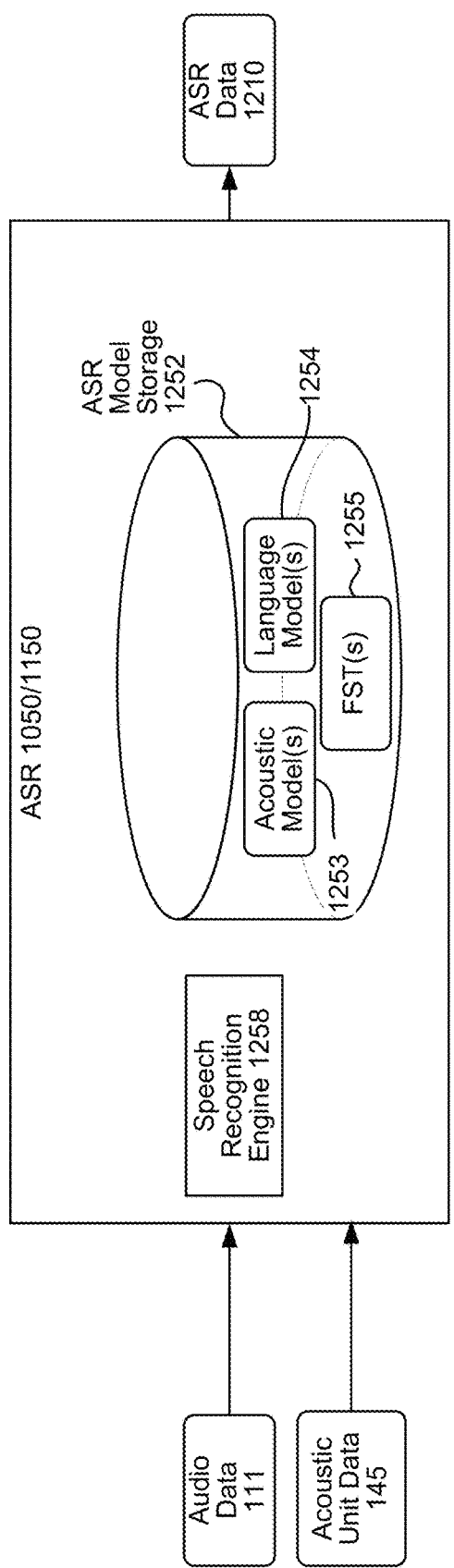
FIG. 12A is a conceptual diagram of an ASR component, according to embodiments of the present disclosure.

FIG. 12A is a conceptual diagram of an ASR component 1050/1150, according to embodiments of the present disclosure. The ASR component 1050 may interpret a spoken natural language input based on the similarity between the spoken natural language input and pre-established language models 1254 stored in an ASR model storage 1252. For example, the ASR component 1050 may compare the audio data 111 with acoustic models 1253 for sounds (e.g., sub-word units or phonemes) and sequences of sounds (for example, using language models 1254) to identify words that match the sequence of sounds spoken in the natural language input. Alternatively, the ASR component 1050 may use a finite state transducer (FST) 1255 to implement the language model functions.

The ASR component may also forego processing by acoustic model(s) 1253 if it receives acoustic unit data 145, such as the data created by the multi-channel transformer/transducer acoustic model 140.

When the ASR component 1050 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 1253 stored in the ASR model storage 1252 or the multi-channel transformer/transducer acoustic model 140), and the likelihood that a particular word, which matches the sounds, would be included in the sentence at the specific location (e.g., using a language or grammar model 1254). Based on the considered factors and the assigned confidence score, the ASR component 1050 may output an ASR hypothesis that most likely matches the spoken natural language input, or may output multiple ASR hypotheses in the form of a lattice or an N-best list, with each ASR hypothesis corresponding to a respective score. The ASR hypothesis and/or N-best list and scores related thereto may be part of the ASR results data 1210.

The ASR component 1050 may include a speech recognition engine 1258. The ASR component 1050 receives audio data 111 (for example, received from a local device 110 having processed audio detected by a microphone by an acoustic front end (AFE) or other component). The speech recognition engine 1258 compares the audio data 111 with acoustic models 1253, language models 1254, FST(s) 1255, and/or other data models and information for recognizing the speech conveyed in the audio data. The audio data 111 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

Figure 12B:
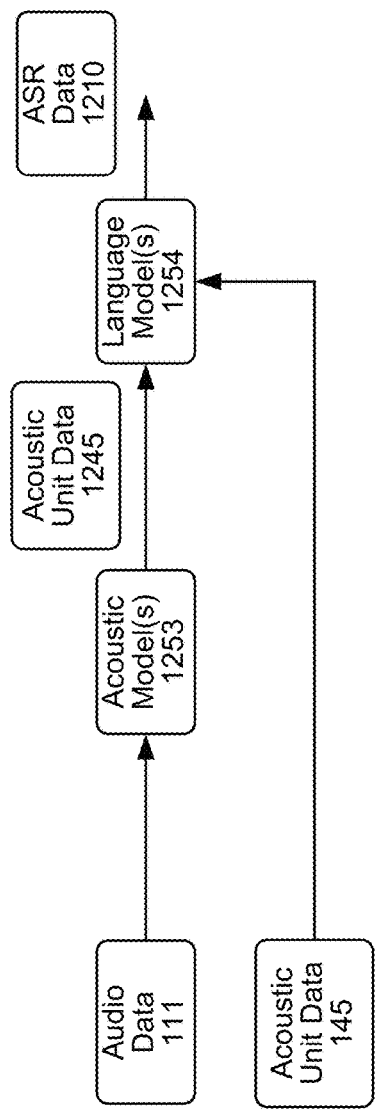
FIG. 12B is a flow diagram illustrating ASR processing according to embodiments of the present disclosure.

FIG. 12B illustrates ASR processing using the components of FIG. 12A according to certain embodiments. The speech recognition engine 1258 may process the audio data 111 with reference to information stored in the ASR model storage 1252. Feature vectors of the audio data 111 may arrive at the system 120 encoded, in which case they may be decoded prior to processing by the speech recognition engine 1258.

The speech recognition engine 1258 attempts to match received feature vectors to language acoustic units (e.g., phonemes) and words as known in the stored acoustic models 1253, language models 1254, and FST(s) 1255. For example, as shown in FIG. 12B, audio data 111 may be processed by one or more acoustic model(s) 1253 to determine acoustic unit data 1245. Alternatively, acoustic unit data 145 determined by the multi-channel transformer/transducer acoustic model 140 may be sent to the ASR component 1050/1150, thus potentially skipping processing using the acoustic model(s) 1253. The acoustic unit data 145/1245 may include indicators of acoustic units detected in the audio data 111 by the ASR component 1050 and corresponding scores. For example, acoustic units can consist of one or more of phonemes, diaphonemes, tonemes, phones, diphones, triphones, or the like. The acoustic unit data 145/1245 can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data 145/1245 may be processed using the language model 1254 (and/or using FST 1255) to determine ASR result data 1210. The ASR result data 1210 can include one or more ASR hypotheses and corresponding scores. One or more of the hypotheses represented in the ASR data 1210 may then be sent to further components (such as the NLU component 1060) for further processing as discussed herein. The ASR data 1210 may include representations of text of an utterance, such as words, subword units, or the like.

The speech recognition engine 1258 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 1050 will output ASR hypotheses that make sense grammatically. The specific models used may be general models or may be models corresponding to a particular domain, such as music, banking, etc.

The speech recognition engine 1258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 1258 may use the acoustic model(s) 1253 to attempt to match received audio feature vectors to words or subword acoustic units. Alternatively such data (e.g., acoustic unit data 145) may be determined by the multi-channel transformer/transducer acoustic model 140 and received by the ASR component 1050/1150. An acoustic unit may be a senone, phoneme, phoneme in context, syllable, part of a syllable, syllable in context, or any other such portion of a word. The speech recognition engine 1258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 1050 outputs ASR hypotheses that make sense grammatically.

The speech recognition engine 1258 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 1258, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 1258 may also compute scores of branches of the paths based on language models or grammars. Language modeling involves determining scores for what words are likely to be used together to form coherent words and sentences. Application of a language model may improve the likelihood that the ASR component 1050 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L 0" (interpreted as the word "yellow") based on the language context of each word within the spoken utterance.

Figure 13:
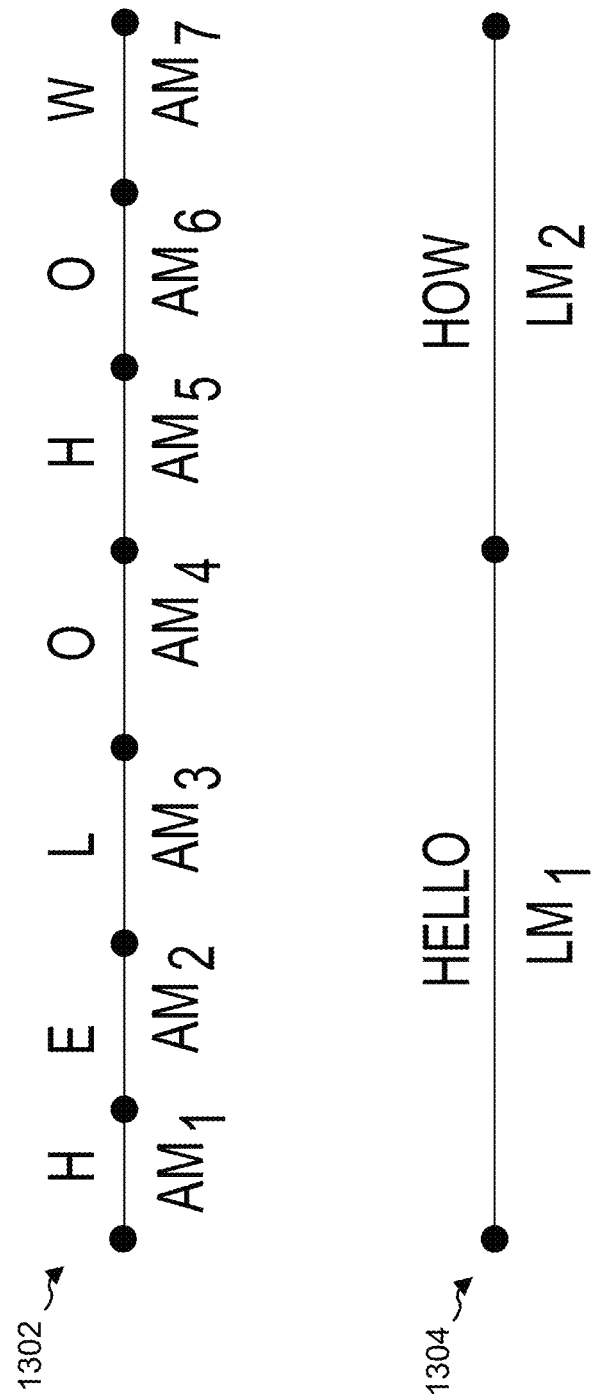
FIG. 13 illustrates phoneme processing and word processing according to one aspect of the present disclosure.

FIG. 13 illustrates the relationship between acoustic modeling and language modeling. As illustrated, each processed phoneme included in the path 1302 is associated with an acoustic model score AM1 through AM7. The language model is then applied to associate each word in the path 1304 with a language model score LM1 or LM2.

As part of the language modeling (or in other phases of the ASR processing) the speech recognition engine 1258 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 1258. Thus, active hypotheses may have a confidence score that is above a certain threshold as they have thus far avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 1258 may iteratively perform additional processing passes on previously processed utterance portions. Later passes may incorporate results of earlier passes to refine and improve results. Paths which are being currently processed and considered as a potential output of the system are thus considered active hypotheses.

Figure 14:
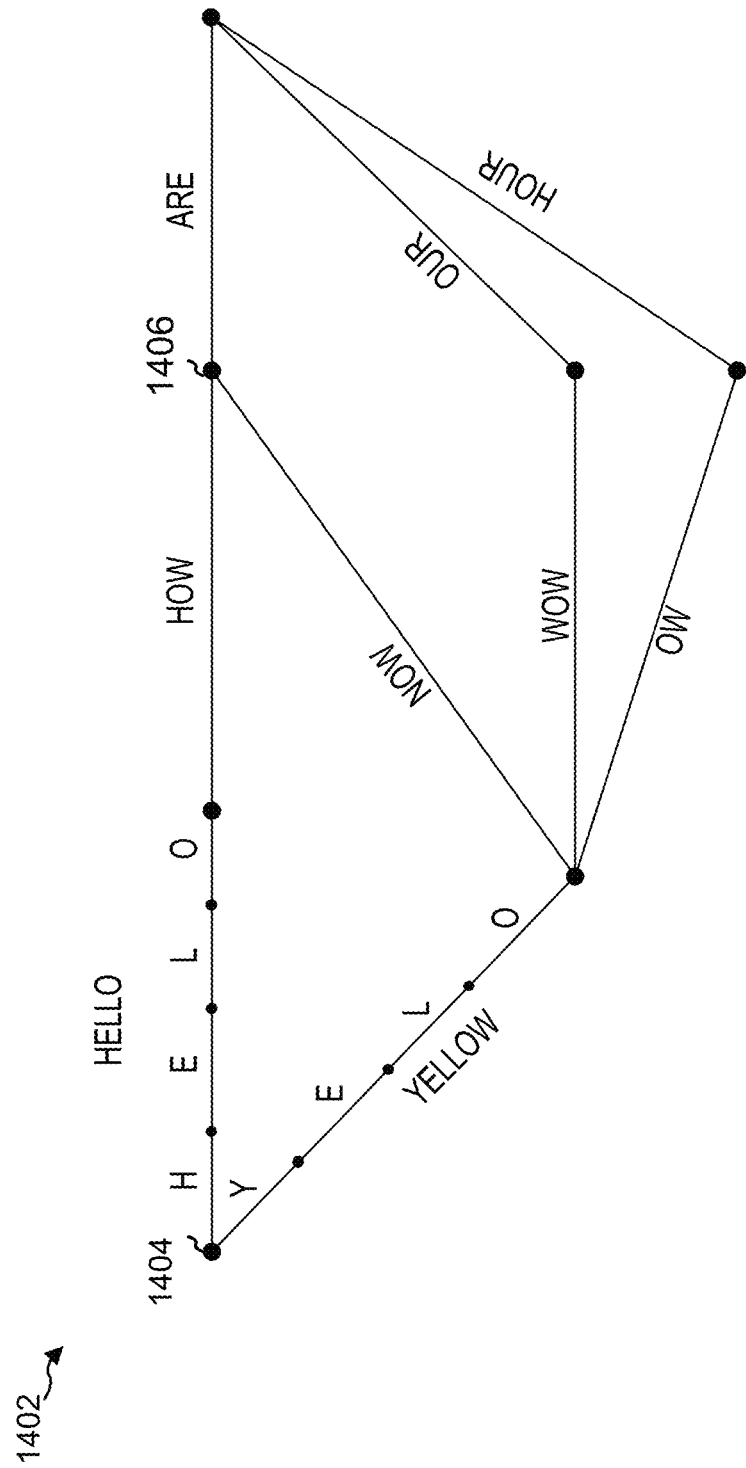
FIG. 14 illustrates a speech recognition lattice according to one aspect of the present disclosure.

FIG. 14 illustrates a speech recognition lattice 1402 according to one aspect of the present disclosure. The speech recognition engine 1258 may combine potential paths into a lattice representing speech recognition results. A sample lattice is shown in FIG. 14. The lattice 1402 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 1404 and node 1406 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 1258 as the ASR result for the associated feature vectors.

Figure 16:
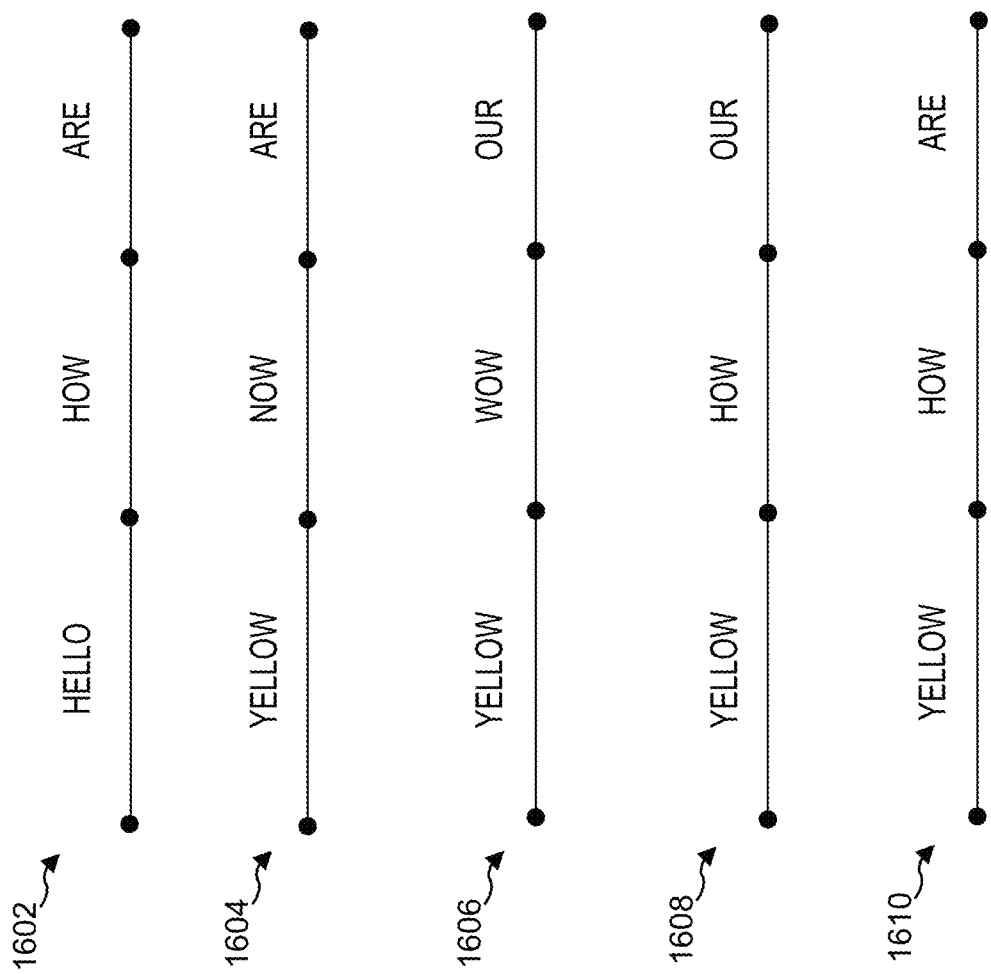
FIG. 16 illustrates a number of hypotheses associated with the lattice of FIG. 12.

FIG. 15 illustrates speech recognition lattices according to one aspect of the present disclosure, and FIG. 16 illustrates a number of hypotheses associated with the lattice of FIG. 12. Illustrated in FIG. 15 are different potential paths 1502, 1504, and 1506 along the lattice 1402. As shown in FIG. 15, path 1502 results in "hello how are," path 1504 results in "yellow now are" and path 1506 results in "yellow wow our." As can be seen, many such paths are possible even in the small example lattice 1402. An example of such paths 1602-1610 are shown in FIG. 16. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

In another example, the speech recognition engine 1258 may receive a series of feature vectors for sound corresponding to a user saying "There is a bat in my car." The speech recognition engine 1258 may attempt to match each feature vector with an acoustic unit, such as a phoneme. As new feature vectors are processed, the speech recognition engine 1258 may determine state transitions (for example, using HMMs) to determine whether a probability of whether a state should either remain the same, or change to a new state (i.e., whether an incoming feature vector results in a state transition from one phoneme to another). As the processing continues, the speech recognition engine 1258 continues calculating such state transition probabilities. After processing one feature vector, the speech recognition engine 1258 may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the speech recognition engine 1258 may also calculate potential states for other phonemes. In this manner multiple states and state transition probabilities may be calculated.

The probable states and probable state transitions calculated by the speech recognition engine 1258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score, or probabilities may be converted to the log domain and added to assist processing.

The speech recognition engine 1258 may also compute scores of branches of the paths based on language models or grammars. Language modeling involves determining scores for what words are likely to be used together to form coherent words and sentences. Application of a language model 1254 may improve the likelihood that the ASR component 1050 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken natural language input. The language modeling may be determined from a text corpus and may be customized for particular applications.

As the speech recognition engine 1258 determines potential words from the input audio data, the lattice may become very large as many potential sounds and words are considered as potential matches for the input audio data. The potential matches may be illustrated as a word result network representing possible sequences of words that may be recognized and the likelihood of each sequence.

The word lattices/ASR result data 1210 generated by the ASR component 1050/1150 may be sent for further processing, for example to NLU component 1060/1160 to complete the speech processing and ultimately execute the user command, for example using other components discussed above with respect to FIGS. 10 and/or 11.

Figure 17:
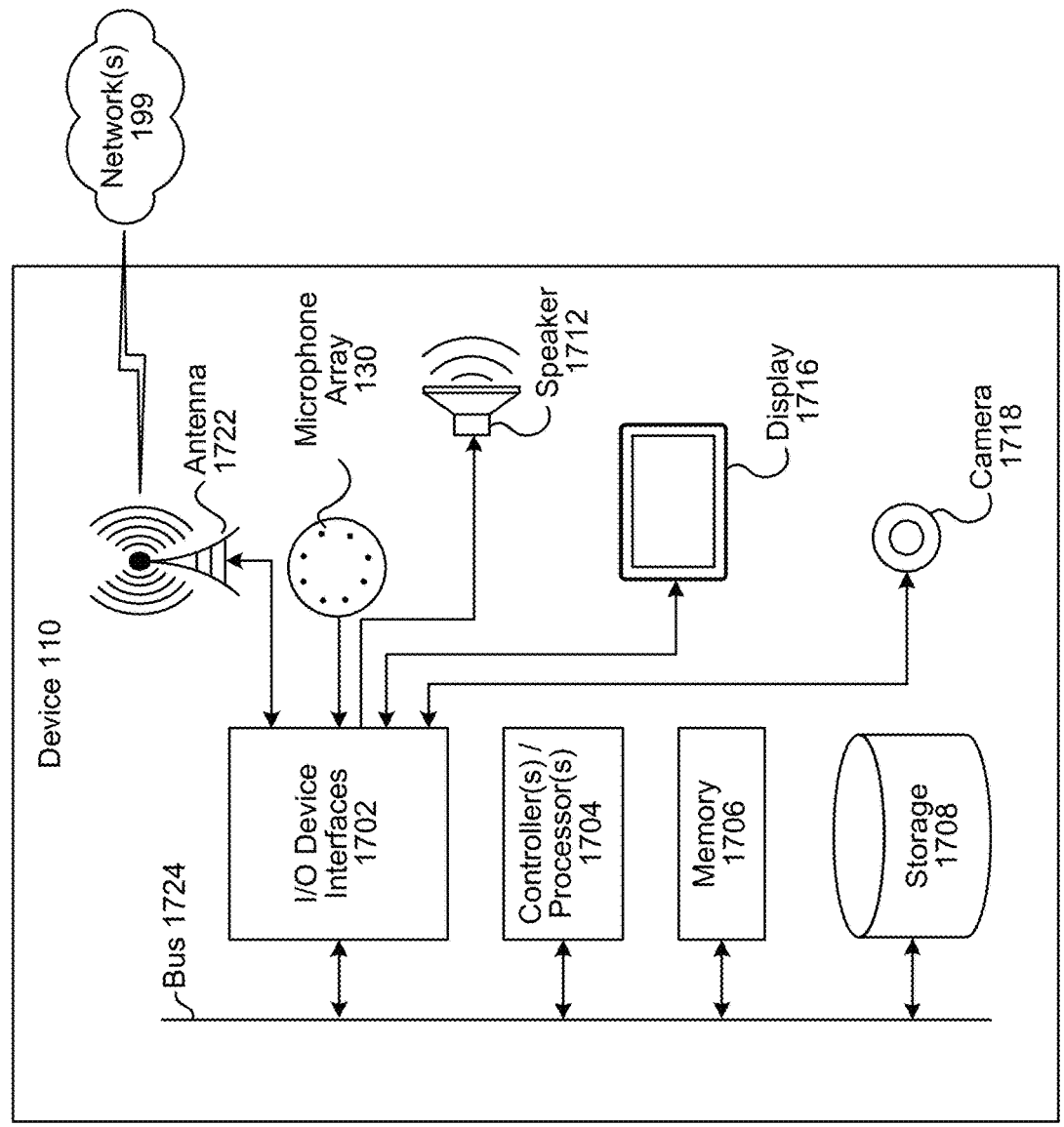
FIG. 17 is a block diagram conceptually illustrating example components of a device, according to embodiments of the present disclosure.

FIG. 17 is a block diagram conceptually illustrating a device 110 that may be used with the system. FIG. 18 is a block diagram conceptually illustrating example components of a remote device, such as the natural language command processing system 120, which may assist with ASR processing, NLU processing, etc. A system (120) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120) may be included in the overall system 100 of the present disclosure, such as one or more natural language processing systems 120 for performing ASR processing, one or more natural language processing systems 120 for performing NLU processing, etc. In operation, each of these systems may include computer-readable and computer-executable instructions that reside on the respective device (120), as will be discussed further below.

Each of these devices (110/120) may include one or more controllers/processors (1704/1804), which may each include a central processing unit (CPU) for processing data and computer-readable instructions, and a memory (1706/1806) for storing data and instructions of the respective device. The memories (1706/1806) may individually include volatile random access memory (RAM), non-volatile read only memory (ROM), non-volatile magnetoresistive memory (MRAM), and/or other types of memory. Each device (110/120) may also include a data storage component (1708/1808) for storing data and controller/processor-executable instructions. Each data storage component (1708/1808) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (1702/1802).

Computer instructions for operating each device (110/120) and its various components may be executed by the respective device's controller(s)/processor(s) (1704/1804), using the memory (1706/1806) as temporary "working" storage at runtime. A device's computer instructions may be stored in a non-transitory manner in non-volatile memory (1706/1806), storage (1708/1808), or an external device(s). Alternatively, some or all of the executable instructions may be embedded in hardware or firmware on the respective device in addition to or instead of software.

Each device (110/120) includes input/output device interfaces (1702/1802). A variety of components may be connected through the input/output device interfaces (1702/1802), as will be discussed further below. Additionally, each device (110/120) may include an address/data bus (1724/1824) for conveying data among components of the respective device. Each component within a device (110/120) may also be directly connected to other components in addition to (or instead of) being connected to other components across the bus (1724/1824).

Referring to FIG. 17, the device 110 may include input/output device interfaces 1702 that connect to a variety of components such as an audio output component such as a speaker 1712, a wired headset or a wireless headset (not illustrated), or other component capable of outputting audio. The device 110 may also include an audio capture component. The audio capture component may be, for example, a microphone or array of microphones 130, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1716 for displaying content. The device 110 may further include a camera 1718.

Via antenna(s) 1722, the input/output device interfaces 1702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1702/1802) may also include communication components that allow data to be exchanged between devices such as different physical servers in a collection of servers or other components.

The components of the device(s) 110, the natural language command processing system 120, or a skill system (not shown) may include their own dedicated processors, memory, and/or storage. Alternatively, one or more of the components of the device(s) 110, the natural language command processing system 120, or a skill system may utilize the I/O interfaces (1702/1802), processor(s) (1704/1804), memory (1706/1806), and/or storage (1708/1808) of the device(s) 110, natural language command processing system 120, or the skill system, respectively. Thus, the ASR component 1050/1150 may have its own I/O interface(s), processor(s), memory, and/or storage; the NLU component 1060 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language command processing system 120, and a skill system, as described herein, are illustrative, and may be located as a stand-alone device or may be included, in whole or in part, as a component of a larger device or system.

As illustrated in FIG. 19, multiple devices (110*a*-110*n*, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, a microwave 110*j*, etc. (e.g., a device such as a FireTV stick, Echo Auto or the like) may be connected to the network(s) 199 through a wireless service provider, over a Wi-Fi or cellular network connection, or the like. Other devices are included as network-connected support devices, such as the natural language command processing system 120, the skill system(s), and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 1050/1150, the NLU component 1060, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
 receiving, from a microphone array comprising a plurality of microphones, audio data representing an utterance, wherein the audio data comprises:
  a first audio signal representing audio captured by a first microphone of the microphone array, and
  a second audio signal representing audio captured by a second microphone of the microphone array;
 processing the first audio signal to determine first embedded audio data;
 processing the second audio signal to determine second embedded audio data;
 processing the first embedded audio data using a self-attention component to determine first attended data representing a correlation between first time frames within the first embedded audio data;
 processing the second embedded audio data using the self-attention component to determine second attended data representing correlation between second time frames within the second embedded audio data;
 processing at least the first attended data and the second attended data using a cross-channel attention component to determine third attended data corresponding to the first audio signal, the third attended data representing correlation between the first audio signal and at least one other audio signal of the audio data;

processing at least the first attended data and the second attended data using the cross-channel attention component to determine fourth attended data corresponding to the second audio signal, the fourth attended data representing correlation between the second audio signal and at least one other audio signal of the audio data; and processing the third attended data and the fourth attended data to determine output data representing at least one acoustic unit representing the utterance.

2. The computer-implemented method of claim 1, wherein:

determining the third attended data comprises performing an affine transform using the second attended data and further attended data corresponding to at least one other audio signal the audio data excluding the first audio signal; and determining the output data comprises processing the third attended data and the fourth attended data using a multi-channel decoder.

3. The computer-implemented method of claim 1, wherein:

determining the third attended data comprises determining a first average value of the first attended data and further attended data corresponding to at least one other audio signal of the audio data excluding the first audio signal; and processing the third attended data and the fourth attended data to determine the output data comprises:
  determining a second average value of at least the third attended data and the fourth attended data, and
  processing the second average value using a joint network to determine the output data.

4. The computer-implemented method of claim 1, wherein the first embedded audio data, the second embedded audio data and the at least one acoustic unit correspond to a first portion of the utterance, and wherein the method further comprises:

receiving a third audio signal from the first microphone, the third audio signal representing a second portion of the utterance;

receiving a fourth audio signal from the second microphone, the fourth audio signal representing the second portion of the utterance;

after determining the at least one acoustic unit, processing the third audio signal and the fourth audio signal using at least the self-attention component to determine fifth attended data and sixth attended data; and processing the fifth attended data and sixth attended data to determine second output data representing at least one second acoustic unit representing the second portion of the utterance.

5. A computer-implemented method comprising:

receiving first audio data corresponding to a first representation of an utterance captured by at least a first microphone of a microphone array;

receiving second audio data corresponding to a second representation of the utterance captured by at least a second microphone of the microphone array;

processing the first audio data using a self-attention component to determine first attended data;

processing the second audio data using the self-attention component to determine second attended data;

processing at least the first attended data and the second attended data using a cross-channel attention component to determine third attended data corresponding to the first microphone, the third attended data representing correlation between the first audio data and at least the second audio data;

processing at least the first attended data and the second attended data using the cross-channel attention component to determine fourth attended data corresponding to the second microphone, the fourth attended data representing correlation between the second audio data and at least the first audio data; and processing the third attended data and the fourth attended data to determine output data representing a first acoustic unit of the utterance.

6. The computer-implemented method of claim 5, further comprising:

receiving, from the microphone array a plurality of audio signals corresponding to a respective microphone of the microphone array, wherein:
  determining the third attended data comprises performing an affine transform using the second attended data and further attended data corresponding to a subset of the plurality of audio signals corresponding to microphones other than the first microphone; and
  determining the output data comprises processing the third attended data and the fourth attended data using a multi-channel decoder.

7. The computer-implemented method of claim 5, further comprising:

receiving, from the microphone array a plurality of audio signals, each audio signal corresponding to a respective microphone of the microphone array, wherein:
  determining the third attended data comprises determining a first average value of the first attended data and further attended data corresponding to a subset of the plurality of audio signals corresponding to microphones other than the first microphone; and
  processing the third attended data and the fourth attended data to determine the output data comprises:
    determining a second average value of at least the third attended data and the fourth attended data, and
    processing the second average value using a joint network to determine the output data.

8. The computer-implemented method of claim 7, further comprising:

receiving first data representing a second acoustic unit, the second acoustic unit received before the first acoustic unit;

processing the first data using a label embedding component to determine first embedded data; and processing the first embedded data using an encoder to determine first encoded data, wherein the joint network further processes the first encoded data to determine the output data.

9. The computer-implemented method of claim 5, wherein the first audio data, the second audio data and the first acoustic unit correspond to a first portion of the utterance, and wherein the method further comprises:

receiving third audio data corresponding to the first microphone, the third audio data representing a second portion of the utterance;

receiving fourth audio data corresponding to the second microphone, the fourth audio data representing the second portion of the utterance;

after determining the first acoustic unit, processing the third audio data and the fourth audio data using at least the self-attention component to determine fifth attended data and sixth attended data; and processing the fifth attended data and the sixth attended data to determine second output data representing at least one second acoustic unit representing the second portion of the utterance.

10. The computer-implemented method of claim 5, further comprising:
receiving, from the first microphone, a first audio signal;
processing the first audio signal using an embedding component to determine first embedded data, wherein the first audio data is based at least in part on the first embedded data;
receiving, from the second microphone, a second audio signal; and
processing the second audio signal using the embedding component to determine second embedded data, wherein the second audio data is based at least in part on the second embedded data.

11. The computer-implemented method of claim 10, further comprising:
processing the first embedded data with respect to positional encoding data to determine the first audio data; and
processing the second embedded data with respect to the positional encoding data to determine the second audio data.

12. The computer-implemented method of claim 5, wherein a first device comprises the microphone array and determines the output data and wherein the method further comprises:
sending, from the first device to a second device, the output data for further speech processing by the second device.

13. A system, comprising:
at least one processor; and
at least one memory comprising instructions that, when executed by the at least one processor, cause the system to:
receive first audio data corresponding to a first representation of an utterance captured by a first microphone of a microphone array;
receive second audio data corresponding to a second representation of the utterance captured by a second microphone of the microphone array;
process the first audio data using a self-attention component to determine first attended data;
process the second audio data using the self-attention component to determine second attended data;
process at least the first attended data and the second attended data using a cross-channel attention component to determine third attended data corresponding to the first microphone, the third attended data representing correlation between the first audio data and at least the second audio data;
process at least the first attended data and the second attended data using the cross-channel attention component to determine fourth attended data corresponding to the second microphone, the fourth attended data representing correlation between the second audio data and at least the first audio data; and
process the third attended data and the fourth attended data to determine output data representing a first acoustic unit of the utterance.

14. The system of claim 13, wherein the at least one memory further comprises instructions that, when executed by the at least one processor, further cause the system to:
receive, from the microphone array a plurality of audio signals corresponding to a respective microphone of the microphone array,
wherein:
determination of the third attended data comprises performing an affine transform using the second attended data and further attended data corresponding to a subset of the plurality of audio signals corresponding to microphones other than the first microphone; and
determination of the output data comprises processing the third attended data and the fourth attended data using a multi-channel decoder.

15. The system of claim 13, wherein the at least one memory further comprises instructions that, when executed by the at least one processor, further cause the system to:
receive, from the microphone array a plurality of audio signals, each audio signal corresponding to a respective microphone of the microphone array,
wherein:
determination of the third attended data comprises determining a first average value of the first attended data and further attended data corresponding to a subset of the plurality of audio signals corresponding to microphones other than the first microphone; and
the instructions that cause the system to process the third attended data and the fourth attended data to determine the output data comprise instructions that, when executed by the at least one processor, cause the system to:
determine a second average value of at least the third attended data and the fourth attended data, and
process the second average value using a joint network to determine the output data.

16. The system of claim 15, wherein the at least one memory further comprises instructions that, when executed by the at least one processor, further cause the system to:
receive first data representing a second acoustic unit, the second acoustic unit received before the first acoustic unit;
process the first data using a label embedding component to determine first embedded data; and
process the first embedded data using an encoder to determine first encoded data,
wherein the joint network further processes the first encoded data to determine the output data.

17. The system of claim 13, wherein the first audio data, the second audio data and the first acoustic unit correspond to a first portion of the utterance, and wherein the at least one memory further comprises instructions that, when executed by the at least one processor, further cause the system to:
receive third audio data corresponding to the first microphone, the third audio data representing a second portion of the utterance;
receive fourth audio data corresponding to the second microphone, the fourth audio data representing the second portion of the utterance;
after determination of the first acoustic unit, process the third audio data and the fourth audio data using at least the self-attention component to determine fifth attended data and sixth attended data; and process the fifth attended data and the sixth attended data to determine second output data representing at least one second acoustic unit representing the second portion of the utterance.

18. The system of claim 13, wherein the at least one memory further comprises instructions that, when executed by the at least one processor, further cause the system to:
   receive, from the first microphone, a first audio signal;
   process the first audio signal using an embedding component to determine first embedded data, wherein the first audio data is based at least in part on the first embedded data;
   receive, from the second microphone, a second audio signal; and
   process the second audio signal using the embedding component to determine second embedded data, wherein the second audio data is based at least in part on the second embedded data.

19. The system of claim 18, wherein the at least one memory further comprises instructions that, when executed by the at least one processor, further cause the system to:
   process the first embedded data with respect to positional encoding data to determine the first audio data; and
   process the second embedded data with respect to the positional encoding data to determine the second audio data.

20. The system of claim 13, wherein a first device comprises the microphone array and determines the output data and wherein the at least one memory further comprises instructions that, when executed by the at least one processor, further cause the system to:
   send, from the first device to a second device, the output data for further speech processing by the second device.

* * * * *